United States Patent [19]
Terada et al.

[11] Patent Number: 5,478,495
[45] Date of Patent: Dec. 26, 1995

[54] FERROELECTRIC LIQUID CRYSTAL COMPOSITION

[75] Inventors: Masahiro Terada, Atsugi; Akio Yoshida, Chigasaki; Kenji Shinjo; Toshiharu Uchimi, both of Atsugi; Takeshi Togano, Yokohama, all of Japan

[73] Assignee: Canon Kabushiki Kaisha, Tokyo, Japan

[21] Appl. No.: 213,816

[22] Filed: Mar. 17, 1994

Related U.S. Application Data

[63] Continuation of Ser. No. 957,058, Oct. 6, 1992, abandoned, which is a continuation of Ser. No. 794,671, Nov. 18, 1991, abandoned, which is a continuation of Ser. No. 492,294, Feb. 28, 1990, abandoned, which is a continuation of Ser. No. 226,079, Jul. 29, 1988, abandoned.

[30] Foreign Application Priority Data

Jul. 1, 1987 [JP] Japan .................................. 62-190163

[51] Int. Cl.$^6$ .............................. C09K 19/52; G02F 1/13
[52] U.S. Cl. .............................. 252/299.01; 252/299.63; 252/299.64; 252/299.65; 252/299.66; 252/299.67; 359/103
[58] Field of Search ................. 252/299.01, 299.63, 252/299.64, 299.65, 299.66, 299.67; 359/103

[56] References Cited

U.S. PATENT DOCUMENTS

| | | | |
|---|---|---|---|
| 4,556,727 | 12/1985 | Walba et al. | 252/299.01 |
| 4,592,858 | 6/1986 | Higuchi et al. | 252/299.66 |
| 4,613,209 | 9/1986 | Goodby et al. | 350/350 S |
| 4,695,650 | 9/1987 | Walba et al. | 252/299.01 |
| 4,725,688 | 2/1988 | Taguchi et al. | 252/299.01 |
| 4,769,176 | 9/1988 | Bradshaw et al. | 252/299.65 |
| 4,775,223 | 10/1988 | Yoshinaga et al. | 252/299.01 |
| 4,777,280 | 10/1988 | Eidman et al. | 252/299.67 |
| 4,780,241 | 10/1988 | Furukawa et al. | 252/299.63 |
| 4,798,680 | 1/1989 | Nohira et al. | 252/299.01 |
| 4,812,259 | 5/1989 | Yoshinaga et al. | 252/299.65 |
| 4,824,217 | 6/1989 | Chan et al. | 252/299.01 |

FOREIGN PATENT DOCUMENTS

| | | |
|---|---|---|
| 0163229 | 12/1985 | European Pat. Off. . |
| 0206228 | 12/1986 | European Pat. Off. . |
| 0213841 | 3/1987 | European Pat. Off. . |
| 219481 | 4/1987 | European Pat. Off. . |
| 61-243055 | 10/1986 | Japan . |
| 62-205189 | 9/1987 | Japan .................. 252/299.63 |
| 62-205190 | 9/1987 | Japan .................. 252/299.63 |
| 2170214 | 7/1986 | United Kingdom . |
| 87/04705 | 8/1987 | WIPO . |

*Primary Examiner*—Shean Wu
*Attorney, Agent, or Firm*—Fitzpatrick, Cella, Harper & Scinto

[57] ABSTRACT

A ferroelectric liquid crystal composition, comprising at least three mesomorphic compounds represented by the following formula (I):

$$Z-\underset{\underset{H}{|}}{\overset{\overset{A}{|}}{C^*}}-B, \qquad (I)$$

wherein C* denotes an asymmetric carbon atom; E denotes a mesomorphic compound residue including a divalent 6-membered ring-containing group capable of having a substituent; and A and B are mutually different groups respectively selected from the class of (a) methyl group, (b) linear or branched alkyl groups having 2–18 carbon atoms capable of having a substituent, (c) linear or branched alkyloxy groups having 1–18 carbon atoms, (d) linear or branched alkyloxyalkyl groups having 2–18 carbon atoms, (e) linear or branched alkyloxycarbonyl groups having 2–18 carbon atoms, (f) linear or branched alkyloxycarbonylmethyl groups having 3–18 carbon atoms; (g) chlorine or bromine, (h) fluorine, (i) trifluoromethyl group, and (j) cyano group; the above-mentioned at least three mesomorphic compounds belonging to at least three mutually different series of compounds which are different from each other in the combination of the groups A and B attached to the asymmetric carbon atom respectively selected from any one of the sub-classes (a)–(j).

8 Claims, 2 Drawing Sheets

FERROELECTRIC LIQUID CRYSTAL COMPOSITION

This application is a continuation of application Ser. No. 957,058, filed Oct. 6, 1992, now abandoned, which is a continuation of application Ser. No. 794,671, filed Nov. 18, 1991, now abandoned, which is a continuation of application Ser. No. 492,294, filed Feb. 28, 1990, now abandoned, which is a continuation of application Ser. No. 226,079, filed Jul. 29, 1988, now abandoned.

FIELD OF THE INVENTION AND RELATED ART

The present invention relates to a ferroelectric liquid crystal composition, particularly a ferroelectric liquid crystal composition comprising a mixture of specific mesomorphic compounds.

Liquid crystal devices have already been used as various optical modulation devices, particularly as a display device in clocks, watches, electronic calculators, etc. This is because of advantages such that a liquid crystal device requires extremely small power consumption, can be formed in a thin and light apparatus and causes little fatigue of eyes because it is a light-receiving display device.

Most liquid crystal devices which have been put into practice use TN (twisted nematic) type liquid crystals, as shown in "Voltage-Dependent Optical Activity of a Twisted Nematic Liquid Crystal" by M. Schadt and W. Helfrich "Applied Physics Letters" vol. 18, No. 4 (Feb. 15, 1971) pp. 127–128.

These devices are based on the dielectric alignment effect of a liquid crystal and utilize an effect that the average molecular axis direction is directed to a specific direction in response to an applied electric field because of the dielectric anisotropy of liquid crystal molecules. It is said that the limit of response speed is on the order of milli-seconds, which provides an obstacle to an enlargement in fields of application of the liquid crystal device. For example, a simple matrix system of driving is most promising for application to a large-area flat display in view of cost, productivity, etc., in combination. In the simple matrix system, an electrode arrangement wherein scanning electrodes and signal electrodes are arranged in a matrix, and for driving, a multiplex driving scheme is adopted wherein an address signal is sequentially, periodically and selectively applied to the scanning electrodes and prescribed data signals are selectively applied in parallel to the signal electrodes in synchronism with the address signal.

When the above-mentioned TN-type liquid crystal is used in a device of such a driving system, a certain electric field is applied to regions where a scanning electrode is selected and signal electrodes are not selected or regions where scanning electrode is not selected and a signal electrode is selected (which regions are so called "half-selected points"). If the difference between a voltage applied to the selected points and a voltage applied to half-selected points is sufficiently large, and a voltage threshold level required for allowing liquid crystal molecules to be aligned or oriented perpendicular to an electric field is set to a value therebetween, display devices normally operate. However, in fact, as the number (N) of scanning lines increases, a time (duty ratio) during which an effective electric field is applied to one selected point when a whole image area (corresponding to one frame) is scanned decreases with a ratio of 1/N. Accordingly, the larger the number of scanning lines are, the smaller is the voltage difference of an effective value applied to a selected point and non-selected points when scanning is repeatedly effected. As a result, this leads to unavoidable drawbacks of lowering of image contrast or occurrence of interference or crosstalk. These phenomena are regarded as essentially unavoidable problems appearing when a liquid crystal having no bistability (i.e. liquid crystal molecules are horizontally oriented with respect to the electrode surface as stable state and is vertically oriented with respect to the electrode surface only when an electric field is effectively applied) is driven (i.e. repeatedly scanned) by making use of a time storage effect. To overcome these drawbacks, the voltage averaging method, the two-frequency driving method, the multiple matrix method, etc. has been already proposed. However, any method is not sufficient to overcome the above-mentioned drawbacks. As a result, it is the present state that the development of large image area or high packaging density in respect to display elements is delayed because it is difficult to sufficiently increase the number of scanning lines.

It is essential to develop a new type of liquid crystal device in place of a TN-type liquid crystal device in order to ensure a responsiveness comparable with a light-emission type device while retaining the advantages of a liquid crystal device such as low power consumption and a light-receiving type device. As one of such trial, the use of liquid crystal devices having bistability has been proposed by Clark and Lagerwall (e.g., Japanese Laid-Open Patent Appln. No. 56-107216, U.S. Pat. No. 4,367,924, etc.). In this instance, as the liquid crystals having bistability, ferroelectric liquid crystals having chiral smectic C-phase (SmC*) or H-phase (SmH*) are generally used. These liquid crystals have bistable states of first and second stable states with respect to an electric field applied thereto. Accordingly, as different from optical modulation devices in which the above-mentioned TN-type liquid crystals are used, the bistable liquid crystal molecules are oriented to first and second optically stable states with respect to one and the other electric field vectors, respectively. Further, this type of liquid crystal has a property (bistability) of assuming either one of the two stable states in response to an applied electric field and retaining the resultant state in the absence of an electric field.

In addition to the above-described characteristic of showing bistability, the ferroelectric liquid crystal has an excellent property, i.e., a high-speed responsiveness. This is because the spontaneous polarization of the ferroelectric liquid crystal and an applied electric field directly interact with each other to induce transition of orientation states. The resultant response speed is faster than the response speed due to the interaction between dielectric anisotropy and an electric field by 3 to 4 digits.

Thus, a ferroelectric liquid crystal potentially has very excellent characteristics, and by making use of these properties, it is possible to provide essential improvements to many of the above-mentioned problems with the conventional TN-type devices. Particularly, the application to a high-speed optical shutter and a display of a high density and a large picture is expected. For this reason, there has been made extensive research with respect to liquid crystal materials showing ferroelectricity. However, ferroelectric liquid crystal materials developed heretofore cannot be said to satisfy sufficient characteristics required for a liquid crystal device including low-temperature operation characteristic, high-speed responsiveness, etc., so that no ferroelectric liquid crystal device has been commercially reduced to practice.

Among a response time τ, the magnitude of spontaneous polarization Ps and viscosity η, the following relationship exists: τ=η/(Ps·E), where E is an applied voltage. Accordingly, a large response speed can be obtained by (a) increasing the spontaneous polarization, (b) lowering the viscosity η, or (c) increasing the applied voltage. However, the driving voltage has a certain upper limit in view of driving with IC, etc., and should desirably be as low as possible. Accordingly, it is actually necessary to lower the viscosity or increase the spontaneous polarization.

A ferroelectric chiral smectic liquid crystal having a large spontaneous polarization generally provides a large internal electric field in a cell given by the spontaneous polarization and is liable to pose may constraints on the device construction giving bistability. Further, an excessively large spontaneous polarization is liable to accompany an increase in viscosity, so that a remarkable increase in response speed may not be attained as a result.

As described hereinabove, commercialization of a ferroelectric liquid crystal device requires a ferroelectric chiral smectic liquid crystal composition satisfying both a high-speed responsiveness and a good bistability condition suitable for practical use by flexibly changing the value of the spontaneous polarization Ps.

In this regard, if a mesomorphic compound having a chemical species providing a large dipole moment at its optically active site is incorporated in a liquid crystal composition, the magnitude of the spontaneous polarization can be easily controlled. However, mesomorphic compounds having excessively different kinds of optically active sites have poor mutual solubility so that they are liable to fail in providing a uniform liquid crystal composition.

SUMMARY OF THE INVENTION

An object of the present invention is to provide a ferroelectric liquid crystal composition having solved the above-mentioned defects or difficulties.

According to the present invention, there is provided a ferroelectric liquid crystal composition, comprising at least three mesomorphic compounds represented by the following formula (I):

wherein C* denotes an asymmetric carbon atom; Z denotes a mesomorphic compound residue including a divalent 6-membered ring-containing group capable of having a substituent; and A and B are mutually different groups respectively selected from the class of (a) methyl group, (b) linear or branched alkyl groups having 2–18 carbon atoms capable of having a substituent; (c) linear or branched alkyloxy groups having 1–18 carbon atoms, (d) linear or branched alkyloxyalkyl groups having 2–18 carbon atoms, (e) linear or branched alkyloxycarbonyl groups having 2–18 carbon atoms, (f) linear or branched alkyloxycarbonylmethyl groups having 3–18 carbon atoms, (g) chlorine or bromine, (h) fluorine, (i) trifluoromethyl group, and (j) cyano group;

said at least three mesomorphic compounds belonging to at least three mutually different series of compounds which are different from each other in the combination of the groups A and B attached to the asymmetric carbon atom respectively selected from any one of the sub-classes (a)–(j)

There is also provided a ferroelectric liquid crystal device, comprising a pair of substrates respectively having voltage application means and the above-mentioned ferroelectric liquid crystal composition disposed between the pair of substrates; at least one of the substrates having an alignment control layer thereon.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Figure 1:
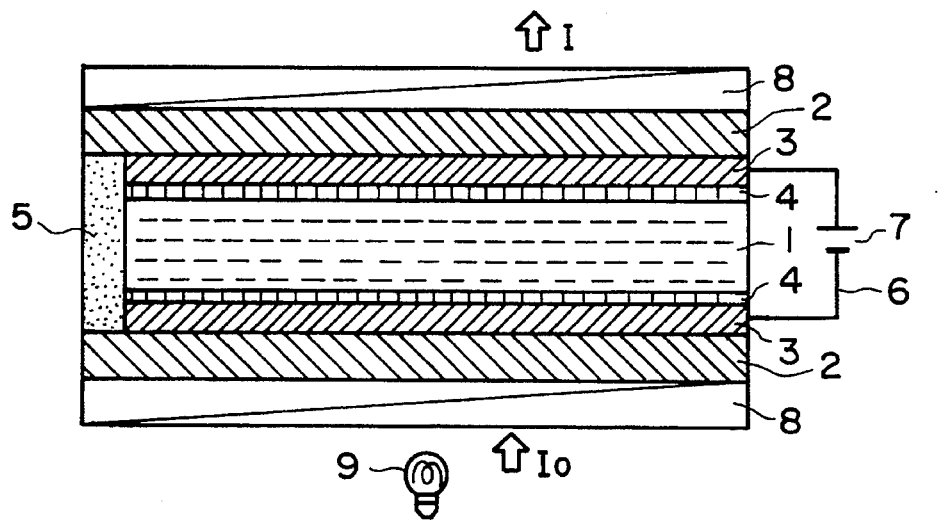
FIG. 1 is a schematic sectional view of a liquid crystal display device using a ferroelectric liquid crystal.

As described hereinabove, Z in the formula (I) denotes a mesomorphic compound residue including a divalent 6-membered ring-containing group (i.e., a 6-membered ring group or a condensed ring group containing a 6-membered ring). Any difference in structure of the residue Z is not taken into consideration of series of mesomorphic compounds for providing the liquid crystal composition of the present invention which is required to contain at least three series of mesomorphic compounds represented by the formula (I). Specific examples of the divalent 6-membered ring may include:

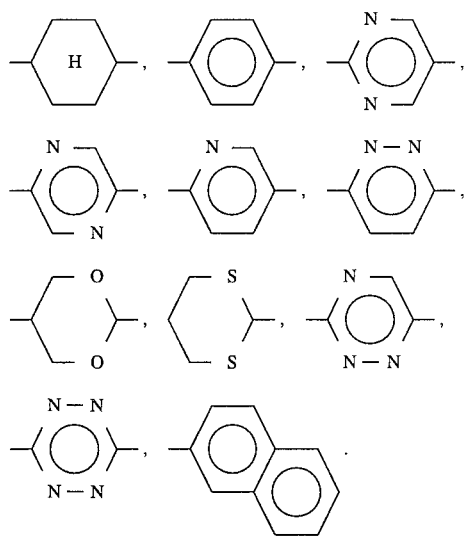

These groups may be contained in a number of 4 or less, preferably 2–4, in the residue, and may be combined with each other through a single bond, —O—,

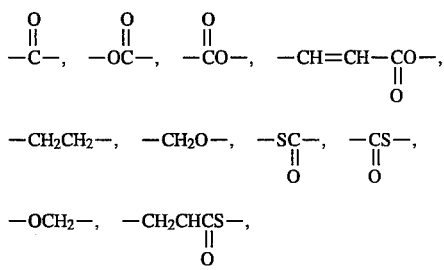

etc. These groups can have a substituent, such as halogen atom, alkyl group, alkoxy group, trifluoromethyl group or cyano group, and a side chain of a branched or linear alkyl or alkoxy group. Further, such a 6-membered ring-containing group may be combined with the asymmetric carbon atom or a side chain through a single bond, alkyloxy group, alkyl group, —O—,

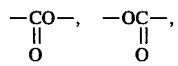

etc.

More specifically, the present invention provides a ferroelectric liquid crystal composition comprising at least one species each from at least three series of mesomorphic compounds defined by the combination of the groups A and B attached to the asymmetric carbon atom. It has been found that various properties of the liquid crystal composition, such as mutual solubility, high-speed reponsiveness and bistability are improved to provide good display characteristics through such mixing of at least three series of mesomorphic compounds.

It is particularly preferred that the above-mentioned at least three series of mesomorphic compounds include at least two mesomorphic compounds which have one of the groups A and B belonging to the same sub-class (i.e., one of the above-mentioned sub-classes (a)–(j)) and the other of the groups A and B gelonging to different sub-classes (i.e., at least two of the above-mentioned sub-classes (a)–(j)).

Hereinbelow, 8 representative series of mesomorphic compounds given by different combinations of the monovalent groups A and B attached to the asymmetric carbon atom in the formula (I) are listed.

Series 1: combination of (a) a methyl group and (b) a linear or branched alkyl group having 2–18 carbon atoms capable of having a substituent;

Series 2: combination of (a) a methyl group and (c) a linear or branched alkyloxy group having 1–18 carbon atoms;

Series 3: combination of (a) a methyl group and (e) a linear or branched alkyloxycarbonyl groups having 2–18 carbon atoms;

Series 4: combination of (g) chlorine or bromine, and (a) methyl group or (b) a linear or branched alkyl group having 2–18 carbon atoms capable of having a substituent;

Series 5: combination of (h) fluorine and (b) a linear or branched alkyl group having 2–18 carbon atoms;

Series 6: combination of (i) a trifluoromethyl group and (f) an alkyloxycarbonylmethyl group having 3–18 carbon atoms;

Series 7: combination of (i) a trifluoromethyl group and (b) a linear or brached alkyl group having 2–18 carbon atoms capable of having a substituent; and Series 8: combination of (j) a cyano group and (b) a linear or branched alkyl group having 2–18 carbon atoms capable of having a substituent.

Specific compounds represented by the formula (I) are enumerated hereinbelow with their Example Compound Nos. with classification under the above-mentioned 8 series.

Series 1

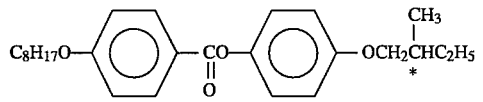 (1-1)

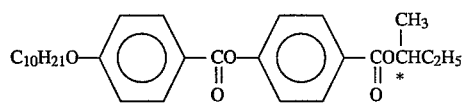 (1-2)

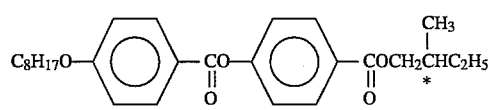 (1-3)

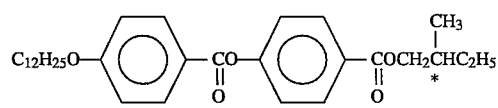 (1-4)

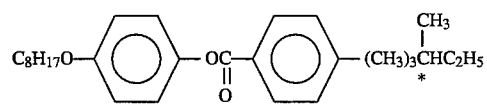 (1-5)

-continued
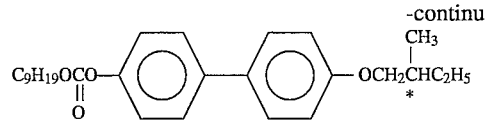 (1-6)
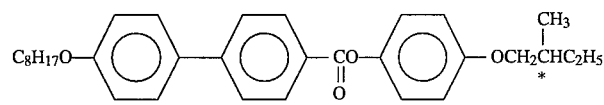 (1-7)
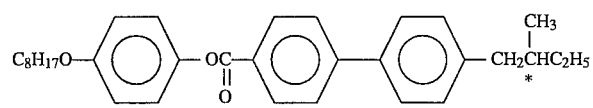 (1-8)
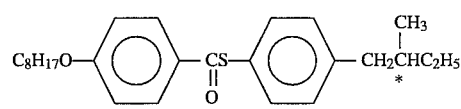 (1-9)
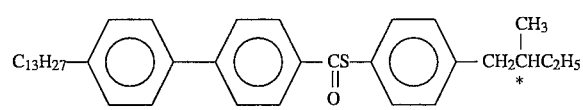 (1-10)
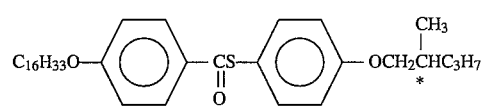 (1-11)
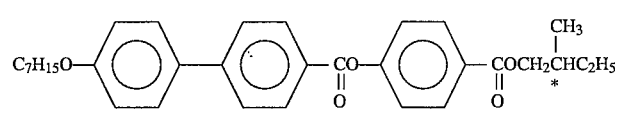 (1-12)
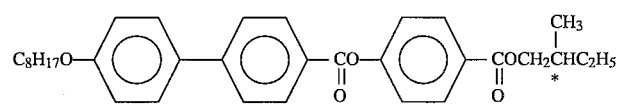 (1-13)
 (1-14)
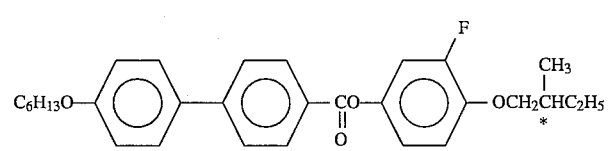 (1-15)
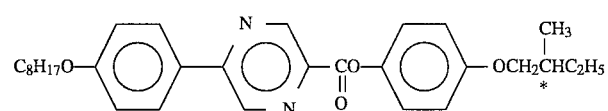 (1-16)
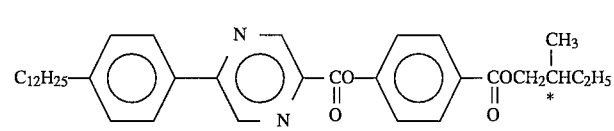 (1-17)
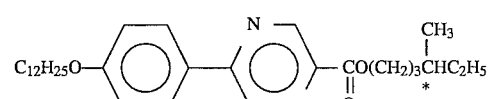 (1-18)
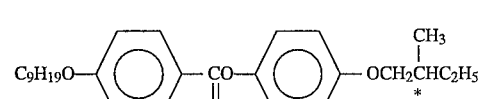 (1-19)

-continued
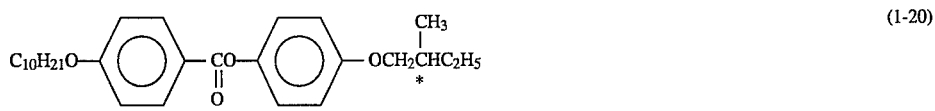 (1-20)
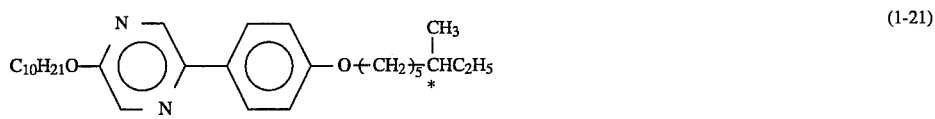 (1-21)
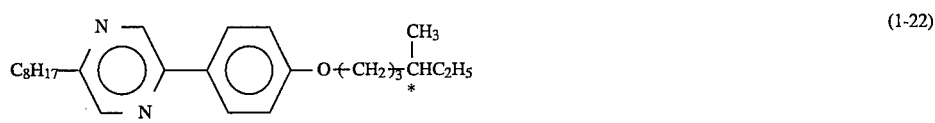 (1-22)
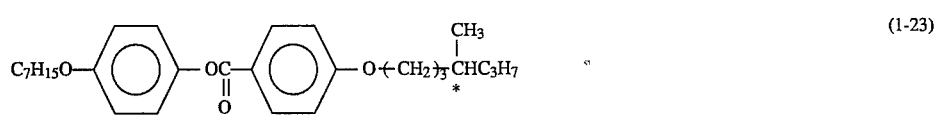 (1-23)
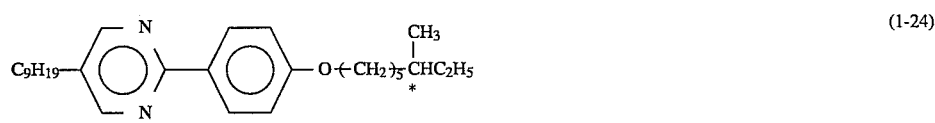 (1-24)
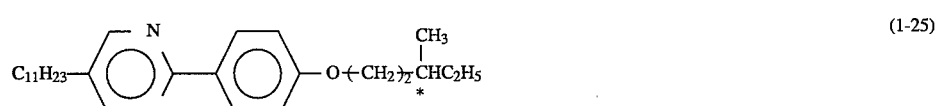 (1-25)
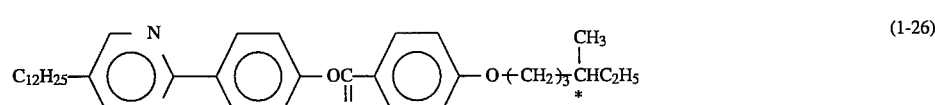 (1-26)
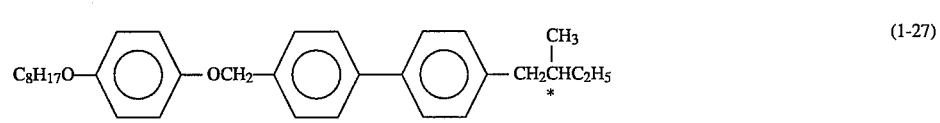 (1-27)
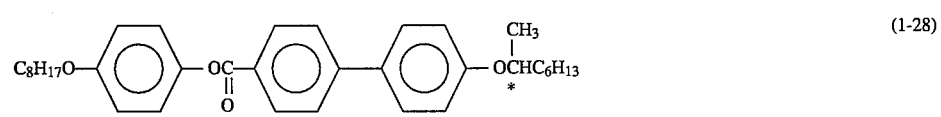 (1-28)
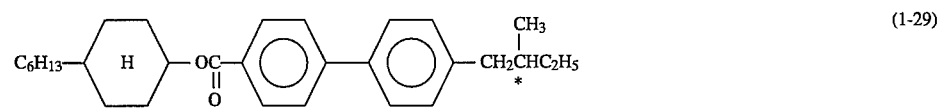 (1-29)
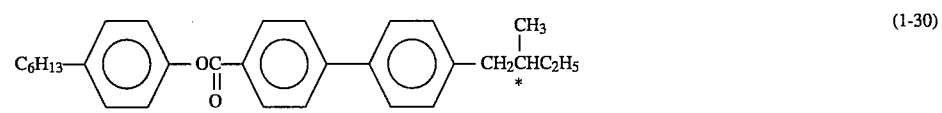 (1-30)
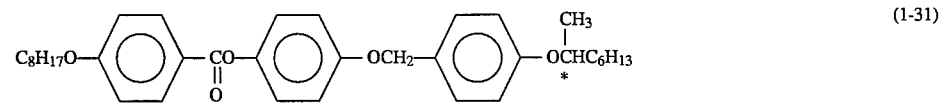 (1-31)
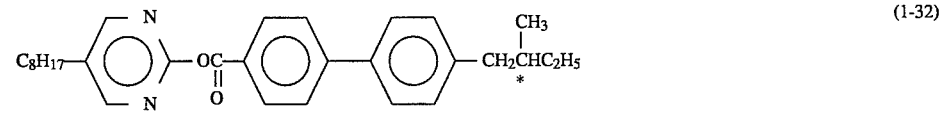 (1-32)

-continued
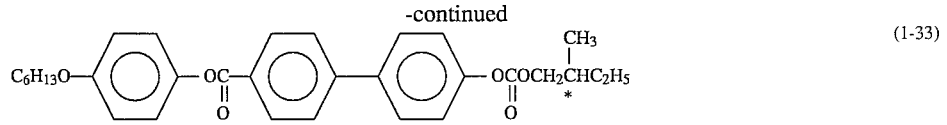 (1-33)
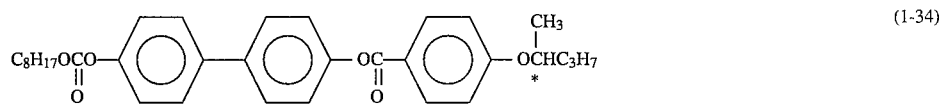 (1-34)
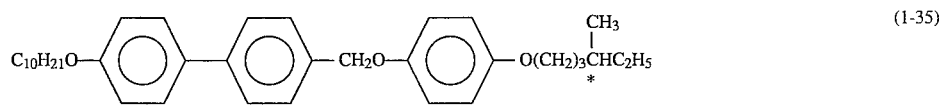 (1-35)
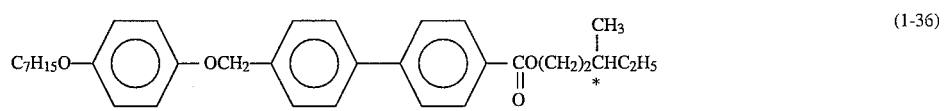 (1-36)
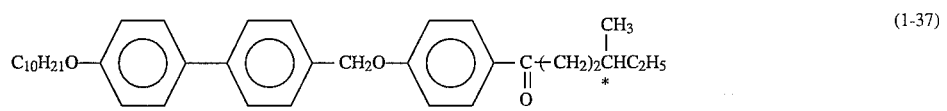 (1-37)
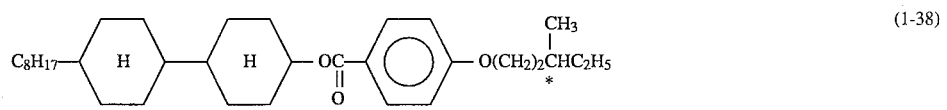 (1-38)
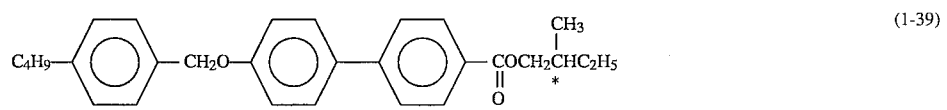 (1-39)
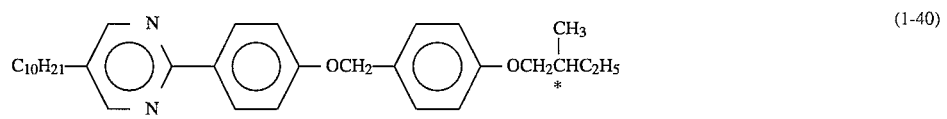 (1-40)
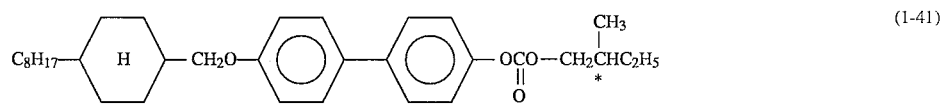 (1-41)
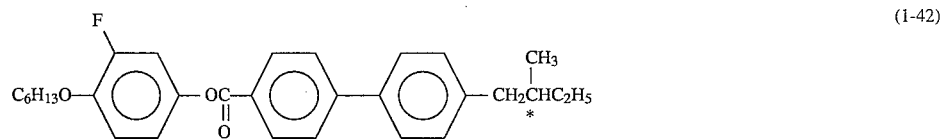 (1-42)
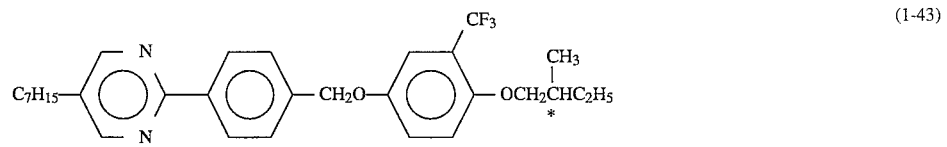 (1-43)
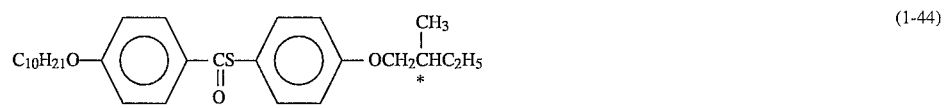 (1-44)
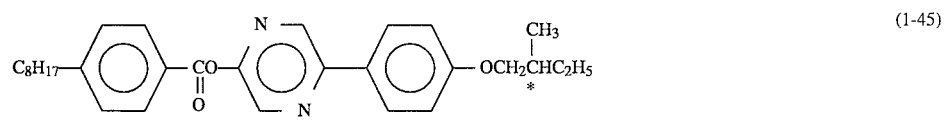 (1-45)

-continued
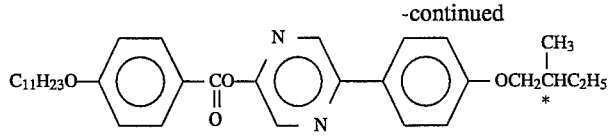
(1-46)
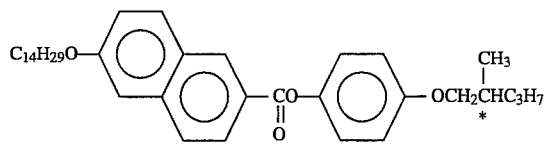
(1-47)
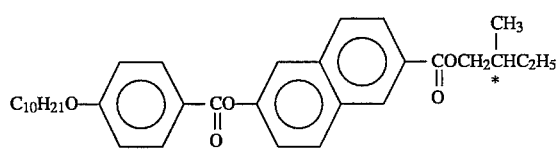
(1-48)
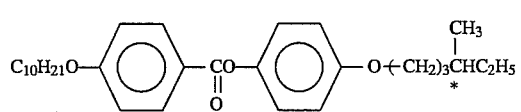
(1-49)
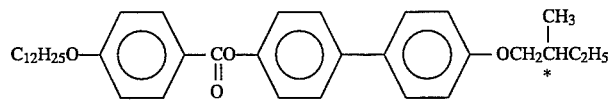
(1-50)
Series 2
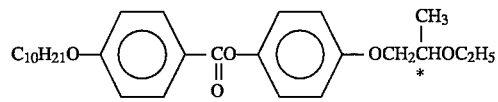
(2-1)
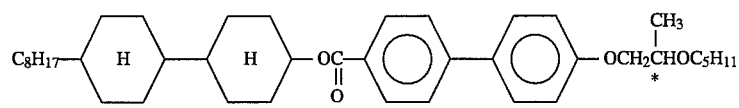
(2-2)
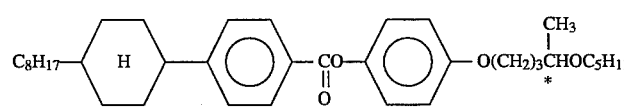
(2-3)
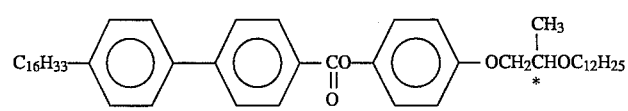
(2-4)
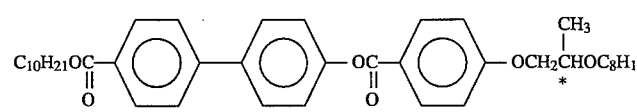
(2-5)
(2-6)
(2-7)
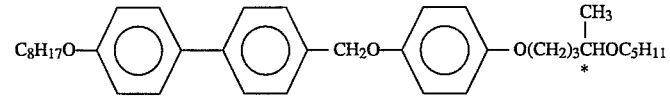
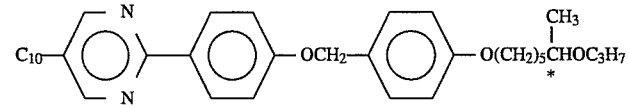
(2-8)

-continued
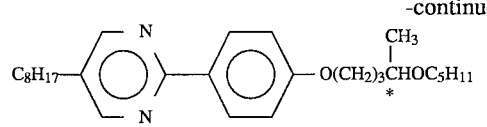 (2-9)
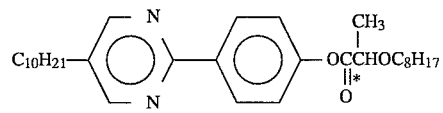 (2-10)
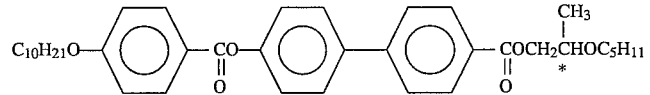 (2-11)
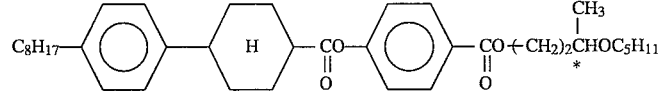 (2-12)
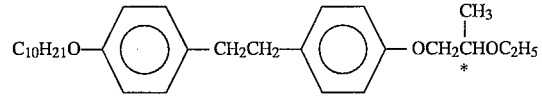 (2-13)
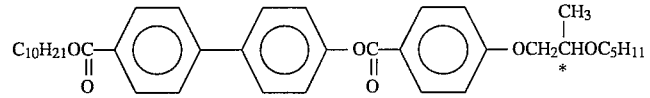 (2-14)
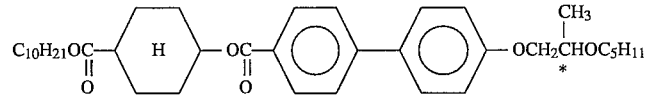 (2-15)
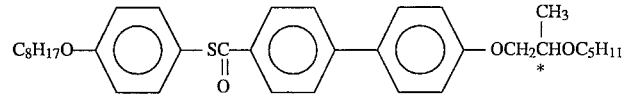 (2-16)
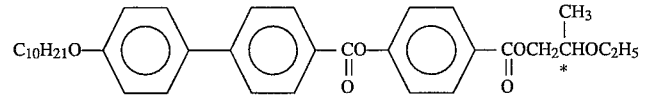 (2-17)
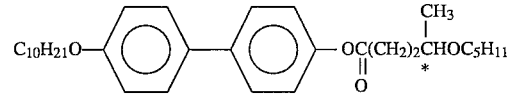 (2-18)
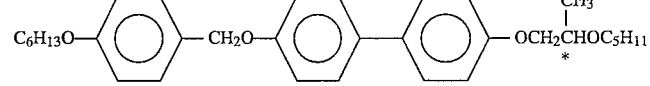 (2-19)
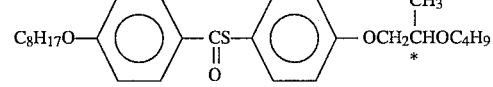 (2-20)
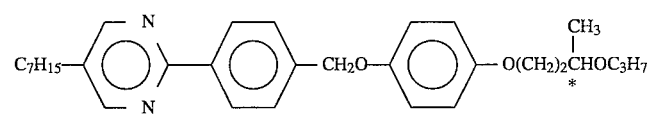 (2-21)
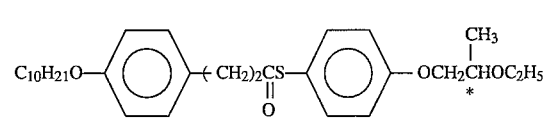 (2-22)

-continued
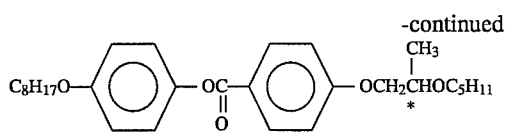
(2-23)
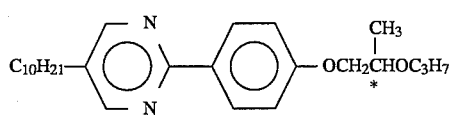
(2-24)
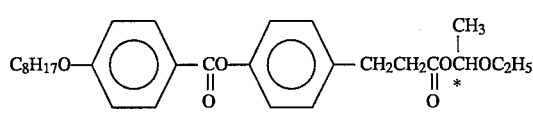
(2-25)
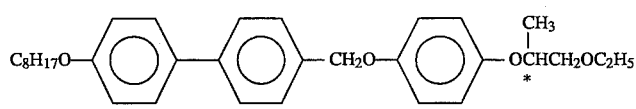
(2-26)
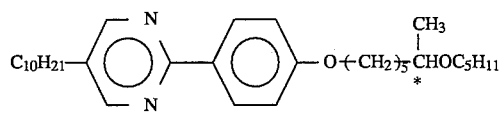
(2-27)
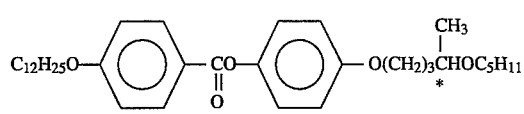
(2-28)
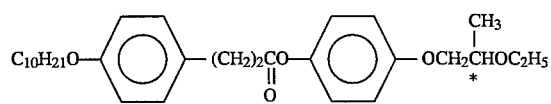
(2-29)
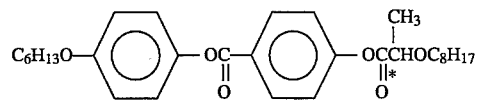
(2-30)
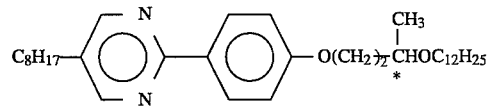
(2-31)
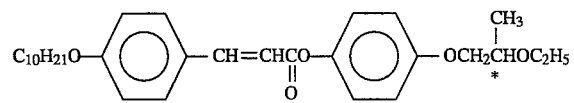
(2-32)
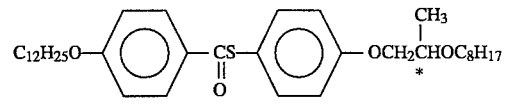
(2-33)
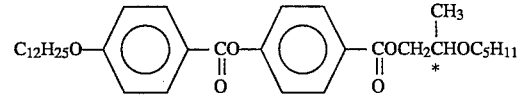
(2-34)
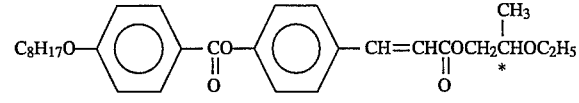
(2-35)
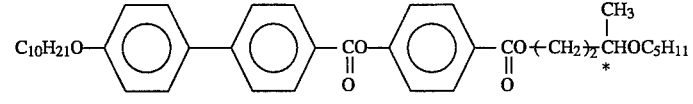
(2-36)

-continued
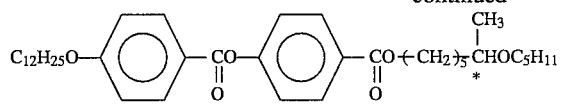 (2-37)
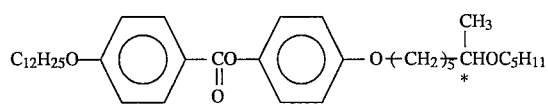 (2-38)
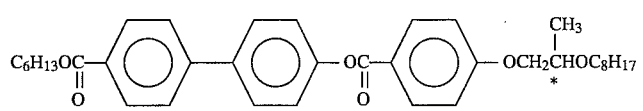 (2-39)
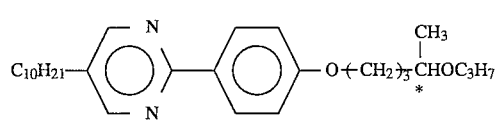 (2-40)
Series 3
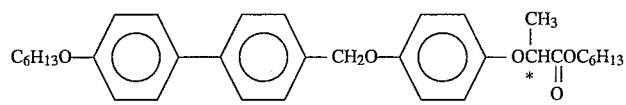 (3-1)
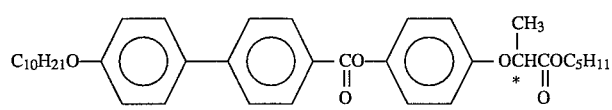 (3-2)
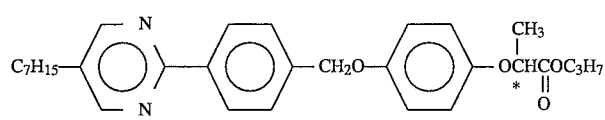 (3-3)
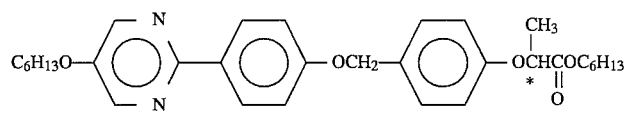 (3-4)
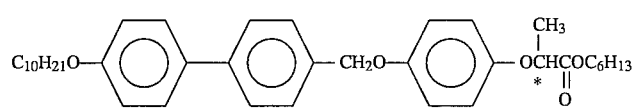 (3-5)
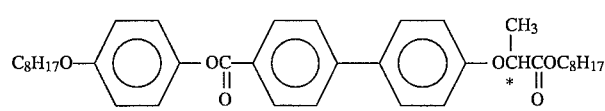 (3-6)
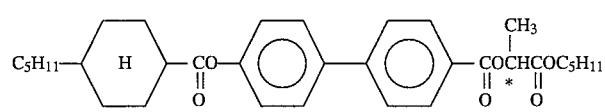 (3-7)
 (3-8)
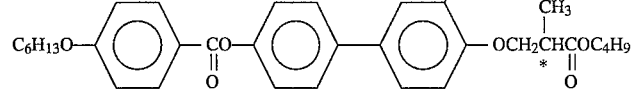 (3-9)
Series 4

-continued
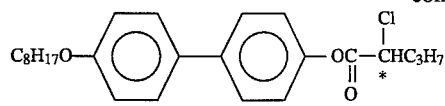 (4-1)
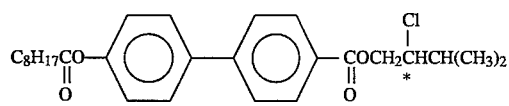 (4-2)
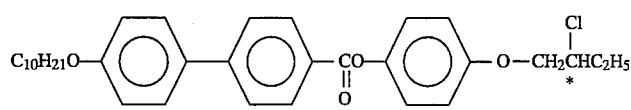 (4-3)
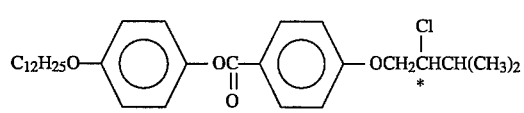 (4-4)
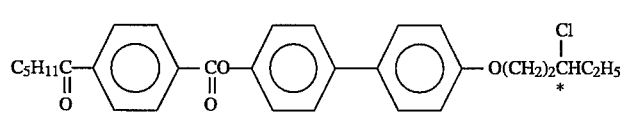 (4-5)
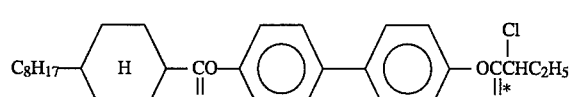 (4-6)
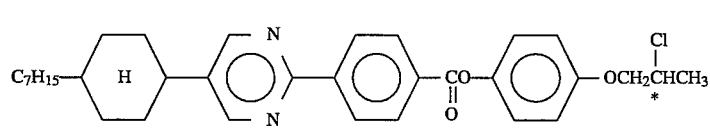 (4-7)
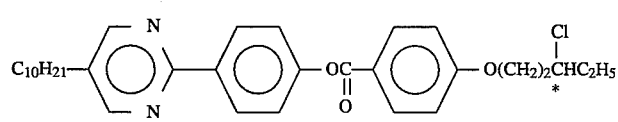 (4-8)
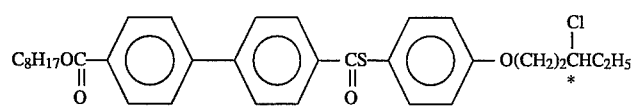 (4-9)
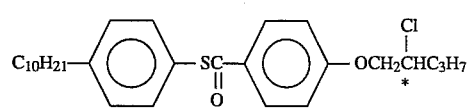 (4-10)
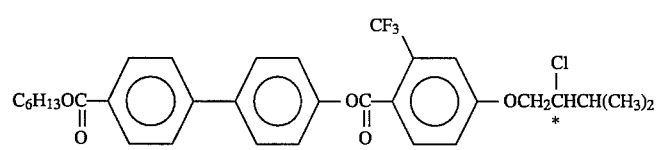 (4-11)
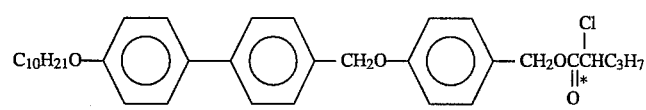 (4-12)
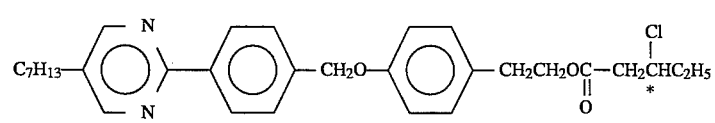 (4-13)
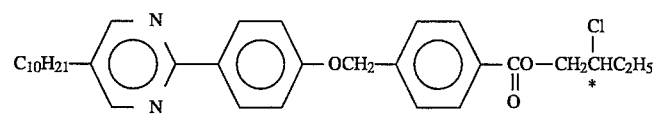 (4-14)

-continued
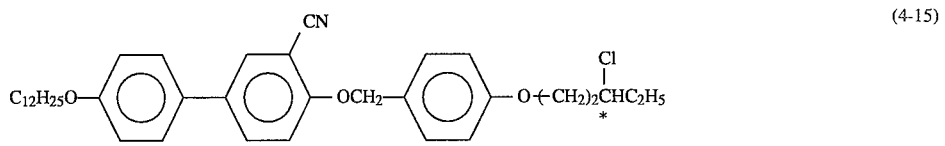
(4-15)
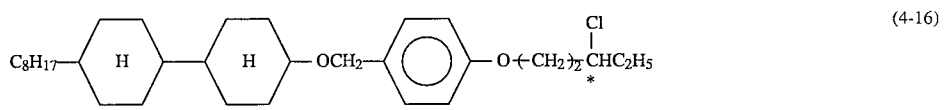
(4-16)
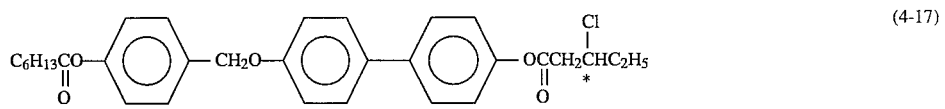
(4-17)
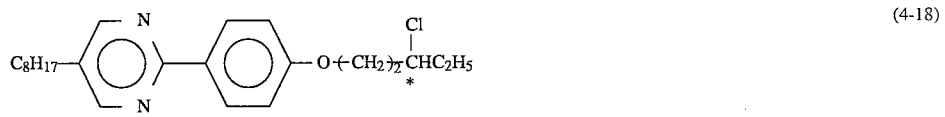
(4-18)
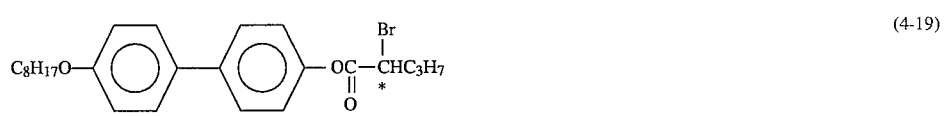
(4-19)
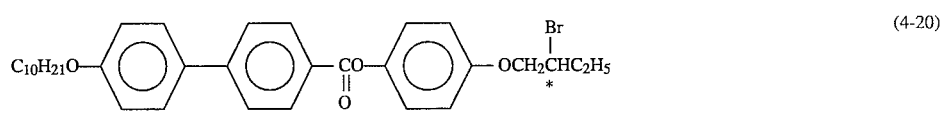
(4-20)
Series 5
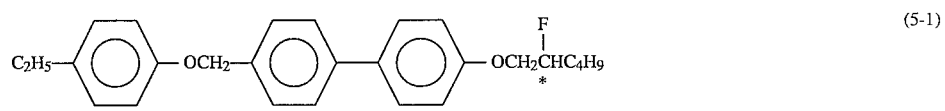
(5-1)
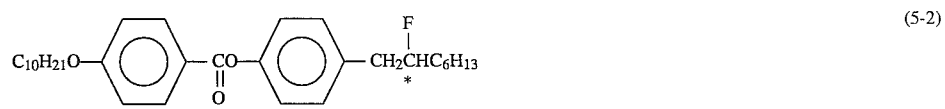
(5-2)
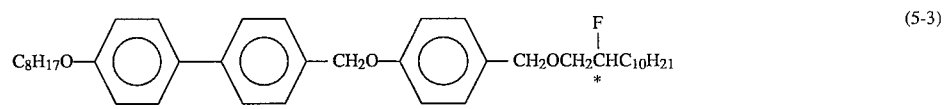
(5-3)
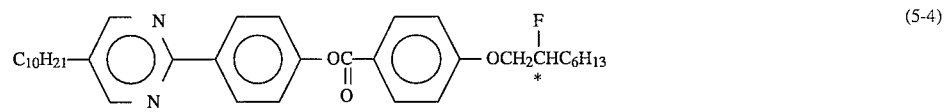
(5-4)
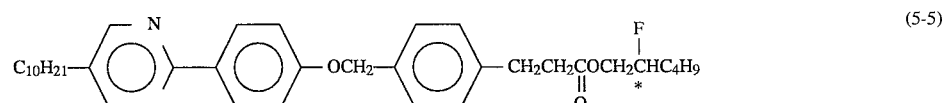
(5-5)
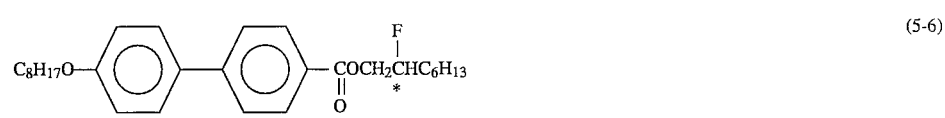
(5-6)
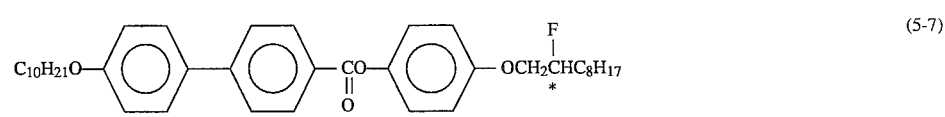
(5-7)

-continued
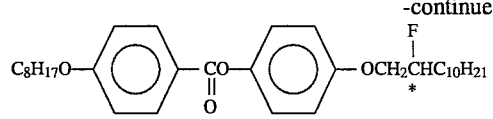 (5-8)
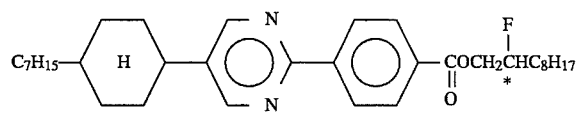 (5-9)
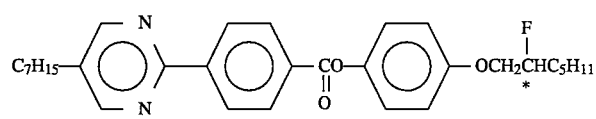 (5-10)
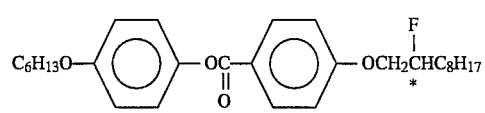 (5-11)
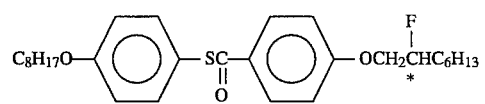 (5-12)
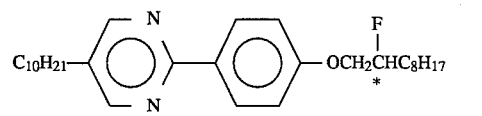 (5-13)
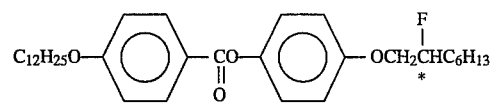 (5-14)
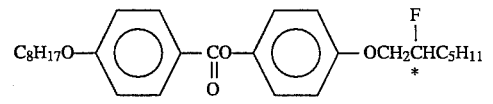 (5-15)
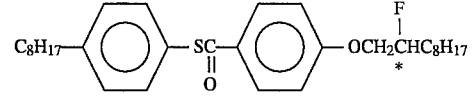 (5-16)
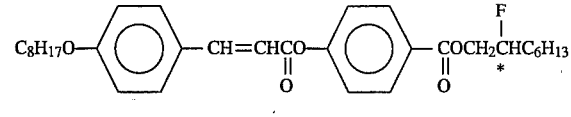 (5-17)
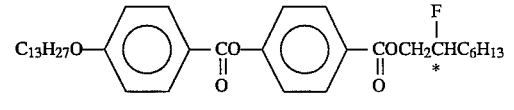 (5-18)
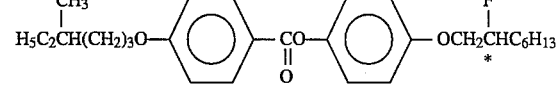 (5-19)
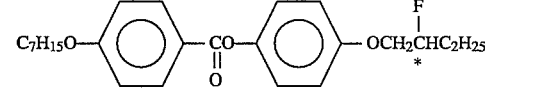 (5-20)
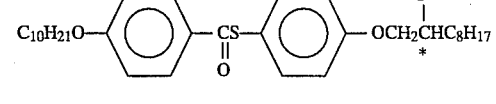 (5-21)

-continued
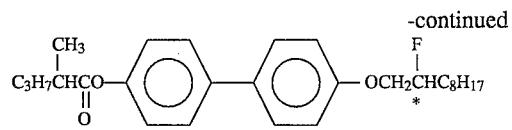
(5-22)
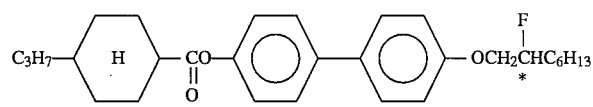
(5-23)
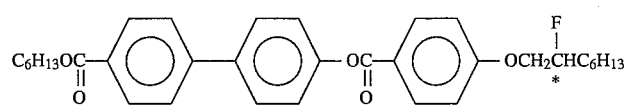
(5-24)
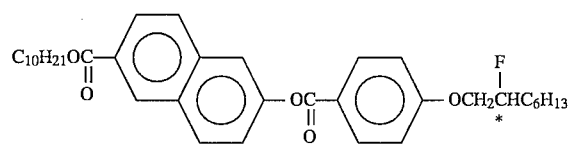
(5-25)
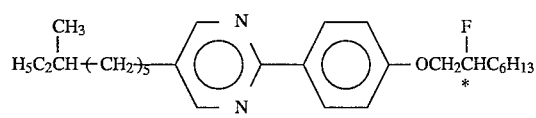
(5-26)
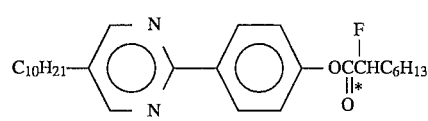
(5-27)
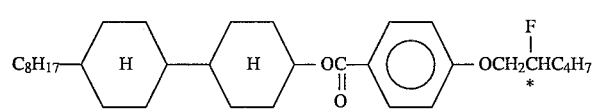
(5-28)
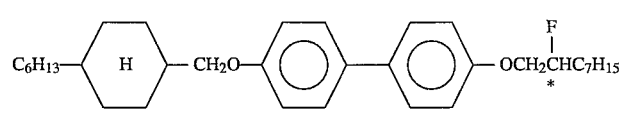
(5-29)
(5-30)
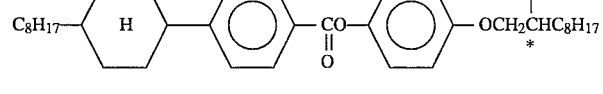
(5-31)
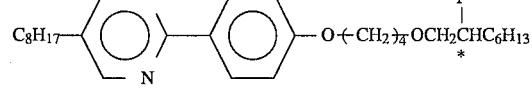
(5-32)
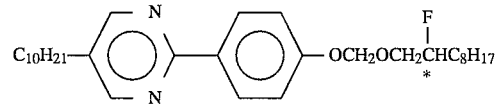
(5-33)
(5-34)
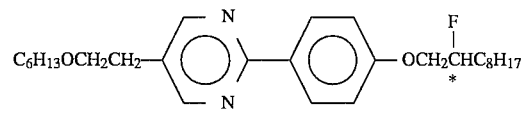

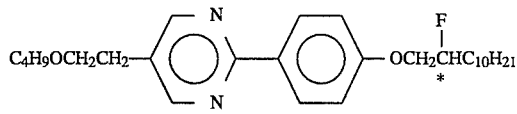 (5-35)
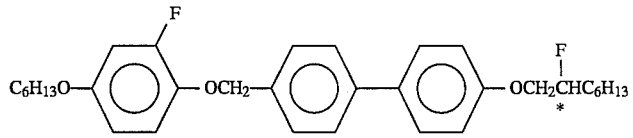 (5-36)
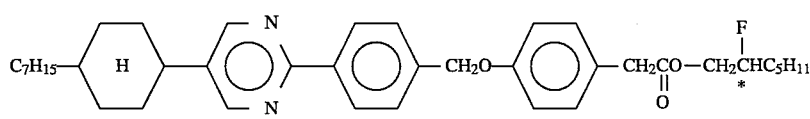 (5-37)
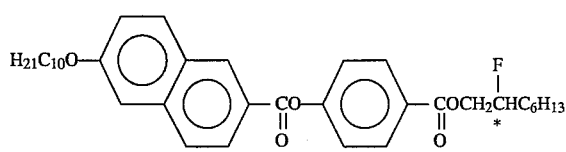 (5-38)
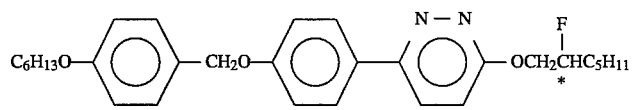 (5-39)
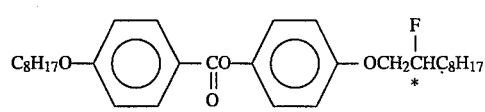 (5-40)
Series 6
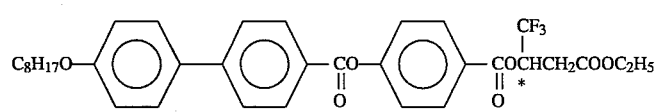 (6-1)
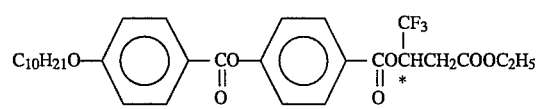 (6-2)
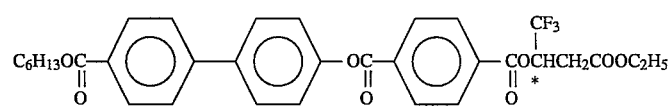 (6-3)
Series 7
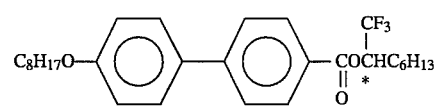 (7-1)
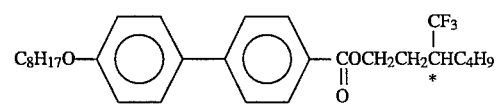 (7-2)
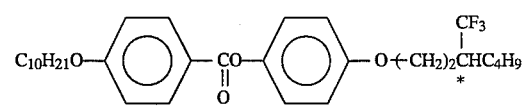 (7-3)
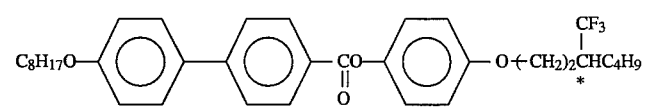 (7-4)

(7-5)

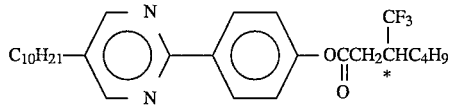
(7-6)

Series 8

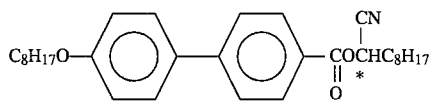
(8-1)

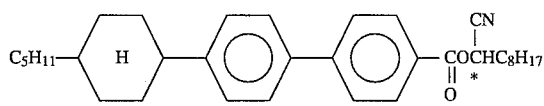
(8-2)

(8-3)

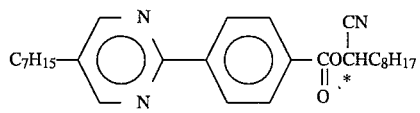
(8-4)

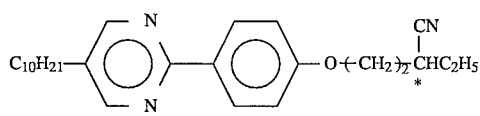
(8-5)

Hereinbelow, representative examples for synthesis of mesomorphic compounds used in the present invention are described hereinbelow.

SYNTHESIS EXAMPLE 1

The above-mentioned Example Compound (5-40) (p'-(2-fluorodecyloxy)phenyl p-octyloxybenzoate) was produced along the following reaction scheme.

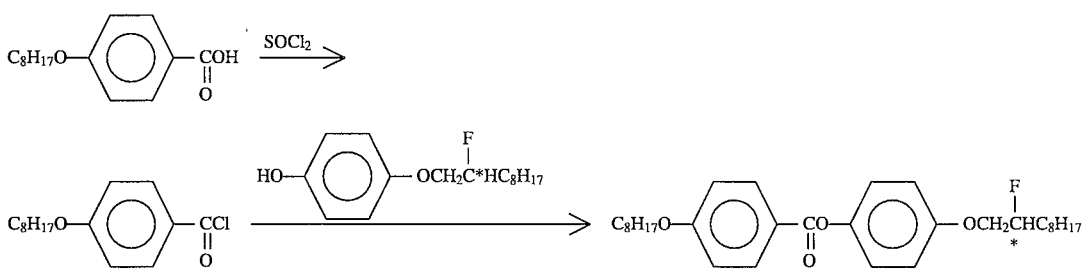

0.93 g (3.7 mmol) of p-octyloxybenzoic acid and 8 ml of thionyl chloride were heat-refluxed for 2 hours, followed by distilling-off of unreacted thionyl chloride to obtain an acid chloride.

Separately, 0.81 g (7.4 mmol) of triethylenediamine was dissolved in 5 ml of dry benzene and then dried for about 30 minutes after addition of potassium hydroxide. The resultant solution was added into a vessel containing 1.0 g (3.7 mmol) of p-hydroquinone mono(2-fluorodecyl) ether, followed by stirring with vibration. The solution was added dropwise to the above acid chloride under stirring, followed by 2 hours of heating at 50° C.

After the reaction, 1N-hydrochloric acid and water were added, and the resultant solution was subjected to extraction with benzene. The benzene solution was dried overnight with addition of anhydrous sodium sulfate.

After distilling off the benzene, the product was purified by silica gel column chromatography with benzene as the eluent to obtain 1.49 g (yield: 81%) of p'-(2-fluorodecyloxy)phenyl p-octyloxybenzoate. The product gave the following optical rotation IR and phase transition data:

Optical rotation $[\alpha]_D^{23.2}$ –1.5° (c=0.94, benzene)

IR (cm$^{-1}$): 2900, 1740, 1610, 1520, 1280, 1250, 1210, 1170, 1130, 760, 690.

Phase transition temperature (°C.)

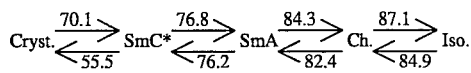

SYNTHESIS EXAMPLE 2

Example compound (2-24) (5-n-decyl-2-[4-(2-propoxypropyloxy)phenyl] pyrimidine) was synthesized in the following manner.

4.75 g of 2-propoxypropanol, 5.39 g of p-toluenesulfonyl chloride, 2,24 g and 10 ml of benzene were placed in a 50 ml-reaction vessel and stirred in a nitrogen gas stream for 22 hours at room temperature. Thereafter, 8.6 ml of heated conc. NaOH solution was added to the reaction mixture, followed by stirring for 5 minutes. The reaction liquid was poured into 200 ml of cooled 10%-hydrochloric acid solution and extracted with hexane to obtain 3.2 g of 2-propoxypropyl-p-toluenesulfonate (tosylate).

Then, 2.2 g of 5-n-decyl-2-[4-hydroxyphenyl]pyrimidine, 0.43 g of KOH and 12 ml of dimethylformamide were stirred for 50 min. under heating at 100° C. Then, 1.5 g of the above tosylate was added thereto, followed by 2.5 hours of stirring under heating at 100° C. After the reaction, the mixture was poured into cold water and extracted three times with benzene. The extract was treated by alumina column chromatography with hexane, and after the removal of the solvent, was recrystallized from ethanol to obtain 1.03 g of 5-n-octyl- 2-[4-(2-propoxypropyloxy)phenyl]pyrimidine.

Melting point: 37.4° C.

IR (cm$^{-1}$); 2850–2970, 1615, 1590, 1435, 1255, 1165, 1115, 1045, 800.

SYNTHESIS EXAMPLE 3

Example Compound (2-26) was prepared in the following manner.

1.25 g (4.01 mmol) of the following alcohol derivative was placed in a 30 ml-round-bottomed flask.

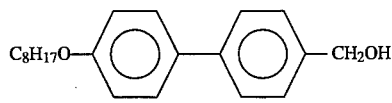

Under cooling, 4 ml of thionyl chloride was added, followed by temperature increase to room temperature. Further, the flask was equipped with a cooling pipe, and the mixture was heat-refluxed for 6 hours on an external bath of 70°–80° C. After the reaction, excessive thionyl chloride was distilled off to obtain an acid chloride, which was then dissolved in 15 ml of toluene.

Then, 0.3 g of sodium hydride (60% in paraffin) was placed in a 200 ml three-necked flask and washed several times with dry n-hexane. Then, 20 ml of a solution of 1.0 g (5.01 mmol) of the following phenol derivative.

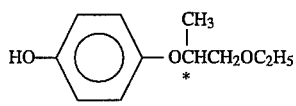

was added thereto dropwise at room temperature, and further 20 ml of dimethylsulfoxide (DMSO) was added, followed by 1 hour of stirring. Then, the above-prepared solution of the acid chloride in toluene was slowly added dropwise thereto, and after the addition, stirring was further continued for 16 hours at room temperature. After the reaction, the product was poured into about 200 ml of iced water, followed by separation of the organic layer and two times of extraction of the aqueous layer with 50 ml of benzene. The benzene extract was mixed with the organic layer separated in advance were washed two times with 5% -hydrochloric acid aqueous solution, once with ion-exchange water and once with 5%-NaOH aqueous solution, followed further by washing of the organic layer with ion-exchange water until the aqueous layer showed a neutral pH value.

The organic layer was separated and dried with magnesium sulfate, followed by distilling-off of the solvent to obtain a crude product, which was then purified by silica gel column chromatography with the use of a developer mixture of n-hexane/dichloromethane (=3/10).

A crystal obtained after distilling-off of the solvent was recrystallized from n-hexane and dried under vacuum at room temperature to obtain 0.507 g of the finally purified objective product. The yield was 25.8%.

Phase transition temperature (°C.)

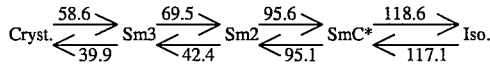

(Sm2, Sm3: smectic phases other than SmA, unidentified).

Other compounds may be synthesized or available as shown below, for example, with respect to the respective series of mesomorphic compounds.

For example, compounds of the series 1 may be commercially available or synthesized according to a process disclosed in Japanese Patent Application Sho 62-32389.

Compounds of the series 2 may be synthesized, preferably according to a process disclosed in Japanese Patent Application Sho. 61-203982.

Further, compounds of the series 5 may be synthesized according to a process of Japanese Patent Application Sho. 60-23288. Compounds of the series 4 may be synthesized according to a process described in S.C,J. Fu. S. U. Birnbaum, J. P. Greenstein, J. Am. Chem. 76, 6054 (1954) or Japanese Laid-Open Patent Application JP-A 60-218358. Compounds of the series 7 may be synthesized according to a process disclosed in Japanese Patent Application Sho. 62-186574, and compounds of the series 8 may be synthesized according to a process disclosed in Japanese Laid-Open Patent Application JP-A 61-243055 or 61-129169.

More generally, mesomorphic compounds having an ester bond may be easily produced by converting a starting carboxylic acid derivative into an acid chloride according to a conventional method and reacting the acid chloride with a corresponding alcohol or thiol derivative in the presence of an alkali as represented by the following reaction scheme:

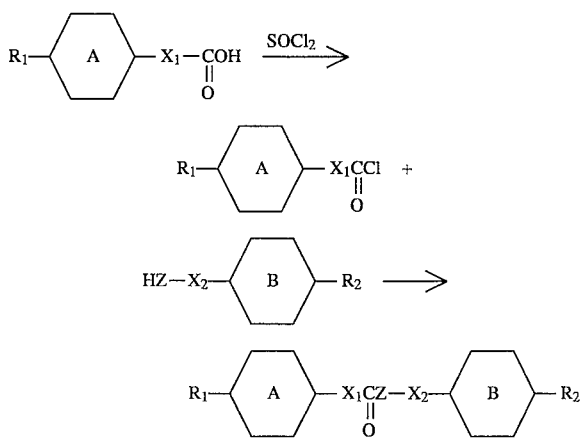

wherein $R_1$ and $R_2$ denote terminal groups, at least one of which has an asymmetric carbon atom;

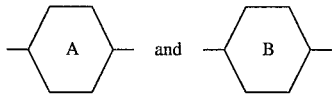

respectively denote a single bond or a divalent 6-membered ring-containing group; $X_1$ and $X_2$ respectively denote a single bond or a divalent chain group; and Z denotes —O— or —S—.

Further, mesomorphic compounds having an ether bond may be easily produced by converting a starting alcohol into a tosylate according to a conventional method and reacting the tosylate with a corresponding phenol derivative as represented by the following reaction scheme:

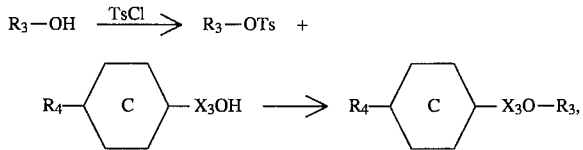

wherein $R_1$ and $R_2$ denote terminal groups, at least one of which has an asymmetric carbon atom;

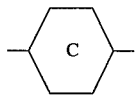

denotes a divalent 6-membered ring-containing group; $X_3$ denotes a single bond or a divalent 6-membered ring-containing group; and $X_3$ denotes a tosyl group.

Mesomorphic compounds having a methyleneoxy group or oxymethylene group may be easily produced by converting a starting benzyl alcohol derivative into a chloride according to a conventional method and reacting the chloride with a metal salt of a corresponding phenol derivative as represented by the following reaction scheme:

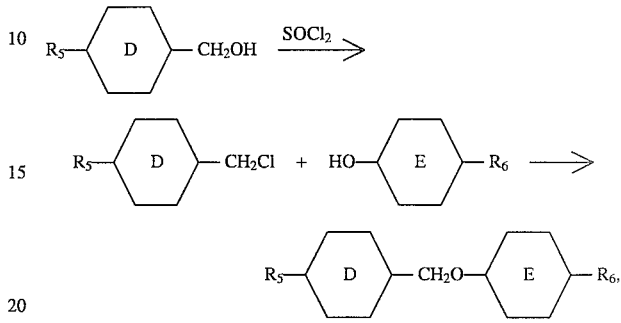

wherein $R_5$ and $R_6$ denote terminal groups, at least one of which has an asymmetric carbon atom;

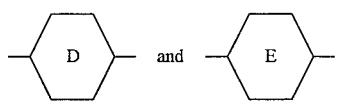

respectively denote a divalent 6-membered ring-containing group.

Further, mesomorphic compounds containing a plurality of bonds as described above may be synthesized by repeating the above reactions in combination as desired.

The ferroelectric liquid crystal composition of the present invention may be prepared by selecting at least one species each from at least three series of mesomorphic compounds represented by the formula (I) and mixing the selected mesomorphic compounds at appropriate ratios. Further, the ferroelectric liquid crystal device of the present invention may be prepared by heating the ferroelectric liquid crystal composition to its isotropic liquid temperature and filling a device cell having the pair of substrates with the heated liquid crystal composition, followed by gradual cooling to form a liquid crystal layer therein.

Each mesomorphic compound may desirably contained in the ferroelectric liquid crystal composition at a proportion selected from the range of 1–99 wt. %.

Further, the ferroelectric liquid crystal composition of the present invention can contain an optically inactive mesomorphic compound having a nematic phase and/or a smectic phase in addition to the optically active mesomorphic compounds represented by the above-mentioned formula (I).

Hereinbelow, some specific examples of such optically inactive mesomorphic compounds with their numbers and structural formulas:

Example Compound

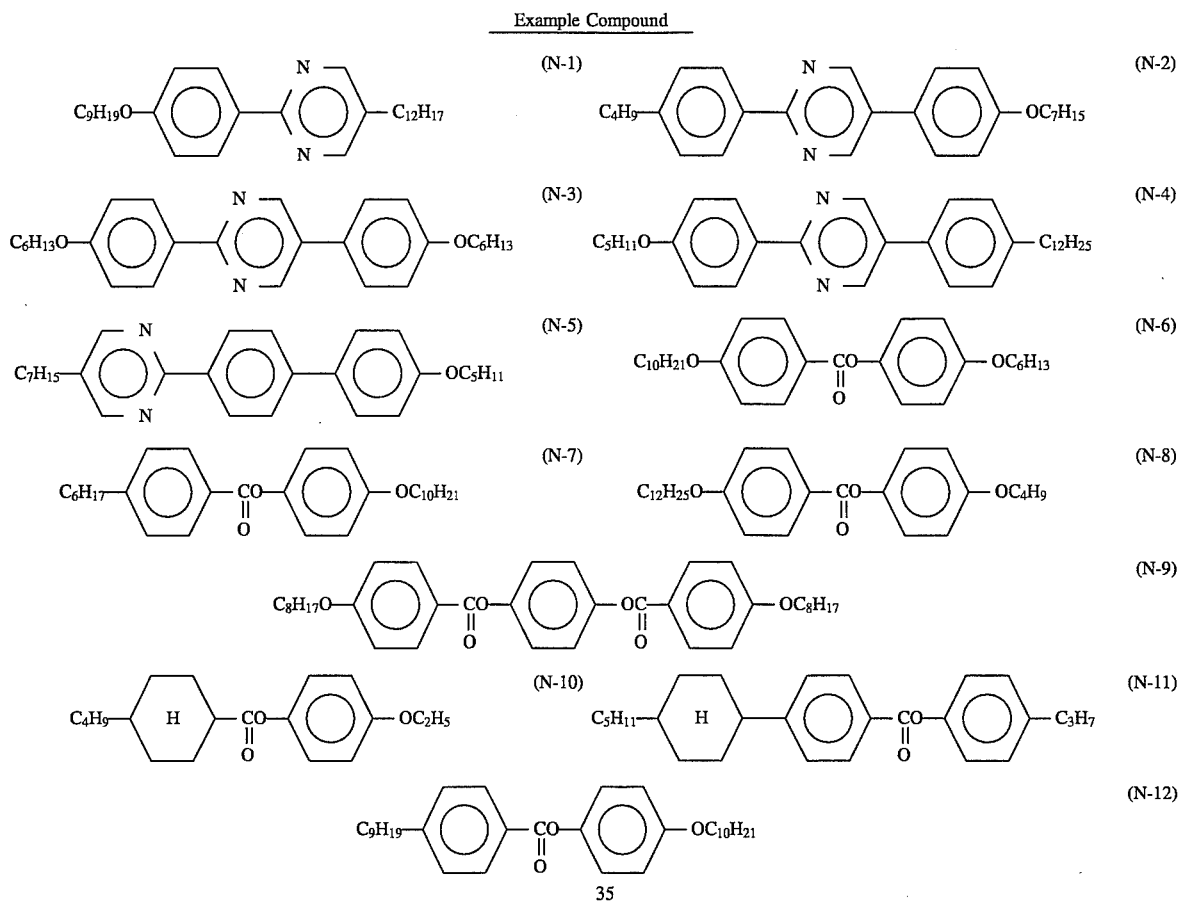

FIG. 1 is a schematic sectional view of an embodiment of the ferroelectric liquid crystal device for explanation of the structure thereof.

Referring to FIG. 1, the ferroelectric liquid crystal device includes a ferroelectric liquid crystal layer 1 disposed between a pair of glass substrates 2 each having thereon a transparent electrode 3 and an insulating alignment control layer 4. Lead wires 6 are connected to the electrodes 3 so as to apply a driving voltage to the liquid crystal layer 1 from a power supply 7. Outside the substrates 2, a pair of polarizers 8 are disposed so as to modulate incident light $I_0$ from a light source 9 in cooperation with the liquid crystal 1 to provide modulated light I.

Each of two glass substrates 2 is coated with a transparent electrode 3 comprising a film of $In_2O_3$, $SnO_2$ or ITO (Indium-Tin-Oxide) to form an electrode plate. Further thereon, an insulating alignment control layer 4 is formed by rubbing a film of a polymer such as polyimide with gauze or acetate fiber-planted cloth so as to align the liquid crystal molecules in the rubbing direction. Further, it is also possible to compose the alignment control layer 4 of two layers, e.g., by first forming an insulating layer of an inorganic material, such as silicon nitride, silicon nitride containing hydrogen, silicon carbide, silicon carbide containing hydrogen, silicon oxide, boron nitride, boron nitride containing hydrogen, cerium oxide, aluminum oxide, zirconium oxide, titanium oxide, or magnesium fluoride, and forming thereon an alignment control layer of an organic insulating material, such as polyvinyl alcohol, polyimide, polyamide-imide, polyester-imide, polyparaxylylene, polyester, polycarbonate, polyvinyl acetal, polyvinyl chloride, polyvinyl acetate, polyamide, polystyrene, cellulose resin, melamine resin, urea resin, acrylic resin, or photoresist resin. Alternatively, it is also possible to use a single layer of inorganic alignment control layer or organic alignment control layer. An inorganic alignment control layer may be formed by vapor deposition, while an organic alignment control layer may be formed by applying a selection of an organic material or a precursor thereof in a concentration of 0.1 to 20 wt. %, preferably 0.2–10 wt. %, by spinner coating, dip coating, screen printing, spray coating or roller coating, followed by curing or hardening under prescribed hardening condition (e.g., by heating). The inorganic insulating layer may have a thickness of ordinarily 50 Å–1 μ, preferably 100 Å–3000 Å, further preferably 100 Å–1000 Å. The two glass substrates 2 with transparent electrodes 3 (which may be inclusively referred to herein as "electrode plates") and further with insulating alignment control layers 4 thereof are held to have a prescribed (but abritrary) gap with a spacer of, e.g., a stripe of epoxy resin formed by screen printing. Alternatively, such a cell structure with a prescribed gap may be formed by sandwiching spacers of silica beads or alumina beads having a prescribed diameter with two glass plates, and then sealing the periphery thereof with, e.g., an epoxy adhesive. Further, a polymer film or glass fiber may also be used as a spacer. Between the two glass plates, a ferroelectric liquid crystal is selaed up to provide a ferroelectric liquid crystal layer in a thickness of generally 0.5 to 20 μ, preferably 1 to 5 μ.

The transparent electrodes 3 are connected to the external power supply 7 through the lead wires 6. Further, outside the glass substrates 2, polarizers 8 are applied. The device shown in FIG. 1 is of a transmission type.

Figure 2:
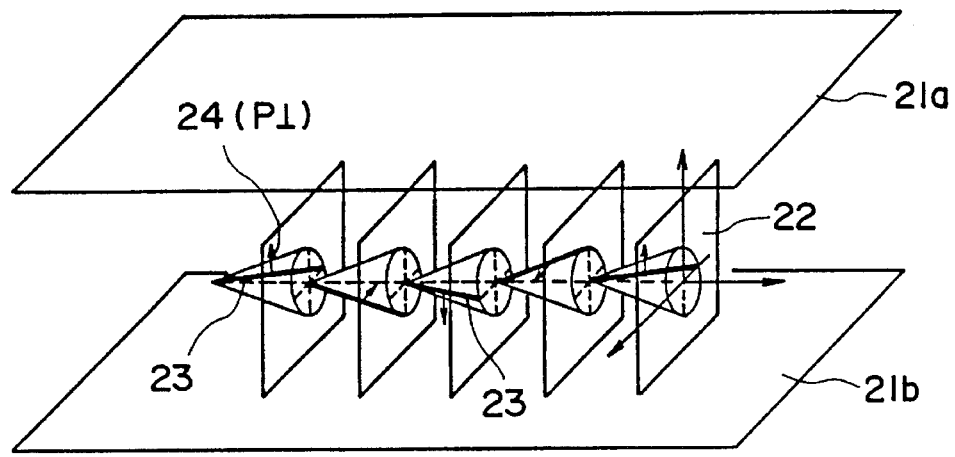
FIGS. 2 and 3 are respectively a schematic perspective view of a ferroelectric liquid crystal device for illustrating the operation of the device.

FIG. 2 is a schematic illustration of a ferroelectric liquid crystal cell (device) for explaining operation thereof. Reference numerals 21a and 21b denote substrates (glass plates) on which a transparent electrode of, e.g., $In_2O_3$, $SnO_2$, ITO (Indium Tin Oxide), etc., is disposed, respectively. A liquid crystal of an SmC*-phase (chiral smectic C phase) in which liquid crystal molecular layers 22 are alginned perpendicular to surfaces of the glass plates is hermetically disposed therebetween. Full lines 23 show liquid crystal molecules. Each liquid crystal molecule 23 has a dipole moment (P⊥) 24 in a direction perpendicular to the axis thereof. The liquid crystal molecules 23 continuously form a helical structure in the direction of extension of the substrates. When a voltage higher than a certain threshold level is applied between electrodes formed on the substrates 21a and 21b, a helical structure of the liquid crystal molecule 23 is unwound or released to change the alignment direction of respective liquid crystal molecules 23 so that the dipole moment (P⊥) 24 are all directed in the direction of the electric field. The liquid crystal molecules 23 have an elongated shape and show refractive anisotropy between the long axis and the short axis thereof. Accordingly, it is easily understood that when, for instance, polarizers arranged in a cross nicol relationship, i.e., with their polarizing directions crossing each other, are disposed on the upper and the lower surfaces of the glass plates, the liquid crystal cell thus arranged functions as a liquid crystal optical modulation device of which optical characteristics vary depending upon the polarity of an applied voltage.

Figure 3:
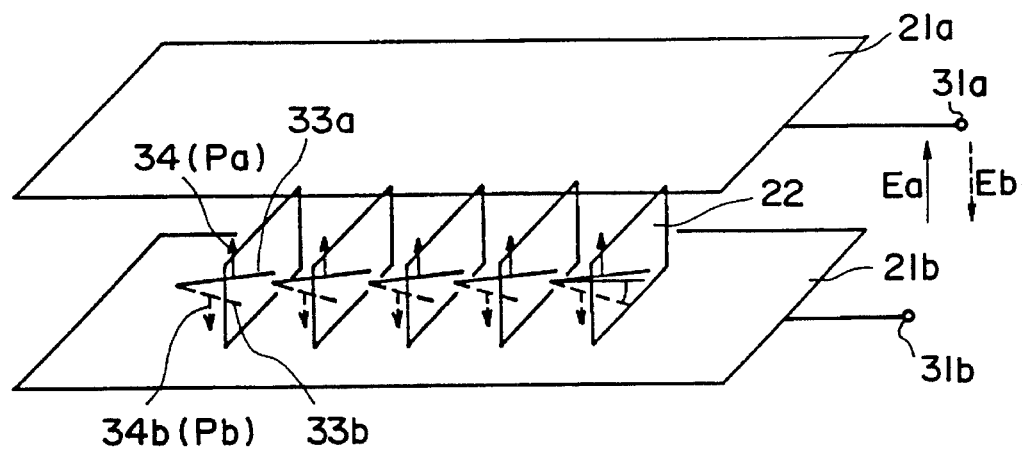

Further, when the liquid crystal cell is made sufficiently thin (e.g., about 1 μ), the helical structure of the liquid crystal molecules is unwound to provide a non-helical structure even in the absence of an electric field, whereby the dipole moment assumes either of the two states, i.e., Pa in an upper direction 34a or Pb in a lower direction 34b as shown in FIG. 3, thus providing a bistable condition. When an electric field Ea or Eb higher than a certain threshold level and different from each other in polarity as shown in FIG. 3 is applied to a cell having the above-mentioned characteristics, the dipole moment is directed either in the upper direction 34a or in the lower direction 34b depending on the vector of the electric field Ea or Eb. In correspondence with this, the liquid crystal molecules are oriented in either of a first stable state 33a and a second stable state 33b.

When the above-mentioned ferroelectric liquid crystal is used as an optical modulation element, it is possible to obtain two advantages. First is that the response speed is quite fast. Second is that the orientation of the liquid crystal shows bistability. The second advantage will be further explained, e.g., with reference to FIG. 3. When the electric field Ea is applied to the liquid crystal molecules, they are oriented in the first stable state 33a. This state is stably retained even if the electric field is removed. On the other hand, when the electric field Eb of which direction is opposite to that of the electric field Ea is applied thereto, the liquid crystal molecules are oriented to the second stable state 33b, whereby the directions of molecules are changed. This state is similarly stably retained even if the electric field is removed. Further, as long as the magnitude of the electric field Ea or Eb being applied is not above a certain threshold value, the liquid crystal molecules are placed in the respective orientation states. In order to effectively realize such a fast response speed and bistability, it is preferred that the cell is as thin as possible, generally 0.5–20 μ, preferably 1–5 μ.

Hereinbelow, the present invention will be explained more specifically with reference to Examples, but the present invention is not confined to these Examples. In the Examples, "parts" are by weight.

EXAMPLE 1

Two 0.7 mm-thick glass plates were provided and respectively coated with an ITO film to form an electrode for voltage application, which was further coated with an insulating layer of vapor-deposited $SiO_2$. On the insulating layer, a 0.2%-solution of silane coupling agent (KBM-602, available from Shinetsu Kagaku K.K.) in isopropyl alcohol was applied by spinner coating at a speed of 2000 rpm for 15 second and subjected to hot curing treatment at 120° C. for 20 min.

Further, each glass plate provided with an ITO film and treated in the above described manner was coated with a 1.5%-solution of polymide resin precursor (SP-510, available from Toray K.K.) in dimethylacetoamide by a spinner coater rotating at 2000 rpm for 15 seconds. Thereafter, the coating film was subjected to heat curing at 300° C. for 60 min. to obtain about 250 Å-thick film. The coating film was rubbed with acetate fiber-planted cloth. The thus treated two glass plates were washed with isopropyl alcohol. After alumina beads with an average particle size of 2 μm were dispersed on one of the glass plates, the two glass plates were applied to each other with a bonding sealing agent (Lixon Bond available from Chisso K.K.) so that their rubbed directions were parallel to each other and heated at 100° C. for 60 min. to form a blank cell. The cell gap was found to be about 2 μm as measured by a Berek compensator.

Then, some Example Compounds were selected from the list described hereinbefore and mixed in amounts listed below.

| Example Compound | Weight parts |
|---|---|
| (1-8) | 25 |
| (1-9) | 15 |
| (2-5) | 12.5 |
| (2-14) | 20 |
| (2-20) | 10 |
| (2-39) | 17.5 |
| (5-4) | 15 |
| (5-14) | 10 |
| (5-40) | 20 |

The mixture was heated into an isotropic liquid, and injected into the above prepared cell under vacuum and, after sealing, was gradually cooled at a rate of 5° C./hour to 25° C. to prepare a ferroelectric liquid crystal device.

The ferroelectric liquid crystal device was subjected to measurement of an optical response time (time from voltage application until the transmittance change reaches 90% of the maximum under the application of a peak-to-peak voltage Vpp of 20 V in combination with right-angle cross-nicol polarizers).

The results are shown below:

| 10° C. | 25° C. | 40° C. |
|---|---|---|
| 1200 μsec | 370 μsec | 150 μsec |

Further, the device was driven at 25° C. to provide a contrast of 13, and a clear switching action was observed. The bistability after removal of the voltage was found to be also good.

COMPARATIVE EXAMPLE 1

A ferroelectric liquid crystal device was prepared and subjected to measurement of an optical response time in the same manner as in Example 1 except that the above-mentioned Example Compounds (5-4), (5-14) and (5-40) were not contained in the liquid crystal layer. The results are shown below.

| 10° C. | 25° C. | 40° C. |
| --- | --- | --- |
| 4200 μsec | 1470 μsec | 640 μsec |

The device was driven at 25° C. to provide a contrast of 8.

Further, the devices prepared in Example 1 and Comparative Example 1 were subjected to standing for 24 hours at 10° C. As a result, precipitation of a part of the components of the liquid crystal composition was observed in the ferroelectric liquid crystal layer of the device of Comparative Example 1, whereas no precipitation was observed in the device of Example 1. Thus, a device containing three series of components having different classes of optically active groups showed better durability than one containing two series of components.

EXAMPLE 2

A ferroelectric liquid crystal device was prepared in the same manner as in Example 1 except that the following Example Compounds selected from the list described hereinbefore were mixed in the respectively indicated proportions to provide a ferroelectric liquid crystal composition used. Then, the device was subjected to measurement of optical response time and observation of switching states. The results are shown below.

| Example Compound | Weight parts | |
| --- | --- | --- |
| (1-1) | 15 | Partial composition A |
| (1-12) | 20 | |
| (1-49) | 20 | |
| (2-1) | 35 | |
| (2-26) | 10 | |
| (5-14) | 12 | Partial composition B |
| (5-15) | 18 | |

| 15° C. | 25° C. | 40° C. |
| --- | --- | --- |
| 900 μsec | 410 μsec | 180 μsec |

The device was driven at 25° C. to provide a contrast of 15, and a clear switching action was observed. Further, the bistability after removal of voltages was also found to be good.

Further, the seven compounds constituting the liquid crystal composition used in the above device was divided into two partial composition comprising 5 compounds and 2 compounds, respectively, as indicated above. The two partial compositions A and B were then mixed with each other at various proportions to prepare various mixtures, and the spontaneous polarization data of the resultant mixtures were respectively measured at a temperature lower by 20° C. than the upper limit temperature of the SmC* phase of each mixture. The measured spontaneous polarization data are plotted in FIG. 4 versus the weight proportions of the partial compositions A and B in the respective mixtures.

Separately, a ferroelectric liquid crystal device was prepared by using the Composition A alone otherwise in the same manner as in Example 2. The change in response time depending on temperature of the device is shown together with that of the device of Example 2 in FIG. 5.

The spontaneous polarization was measured according to "Direct Method with Triangular Waves for Measuring Spontaneous Polarization in Ferroelectric Liquid Crystal", as described by K. Miyasato et al. (Jap. J. Appl. Phys. 22, No. 10, L661 (1983)).

Figure 4:
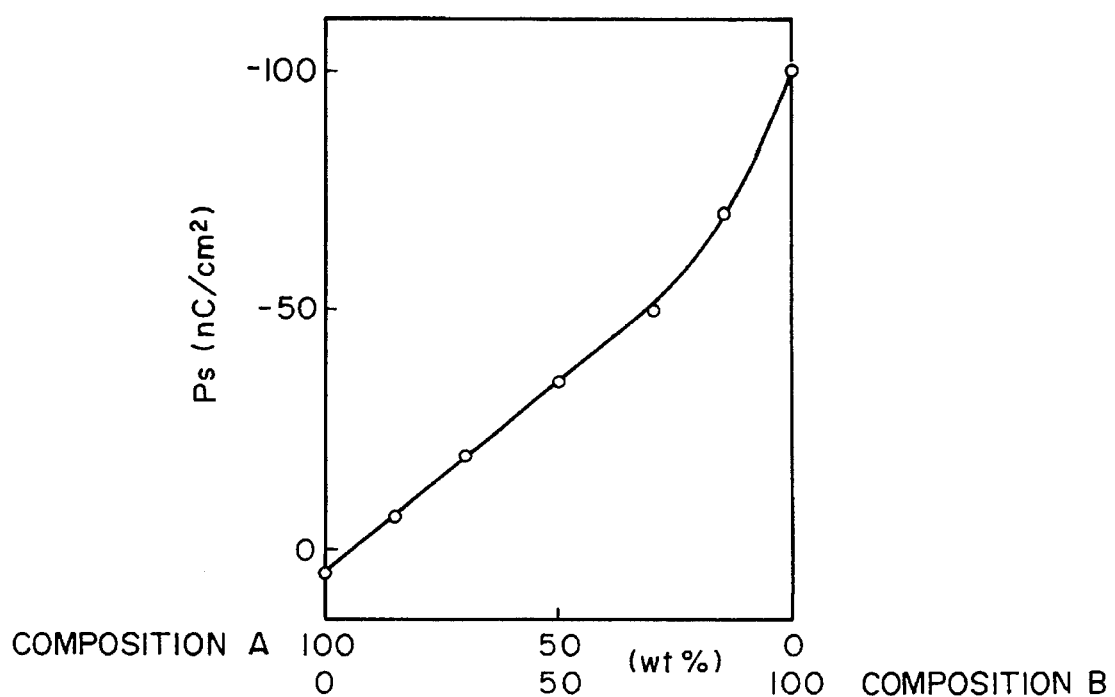
FIG. 4 is a graph showing a change in spontaneous polarization depending on mixing ratios of two liquid crystal compositions A and B which in combination constituted a liquid crystal composition used in Example 2 appearing hereinafter.
Figure 5:
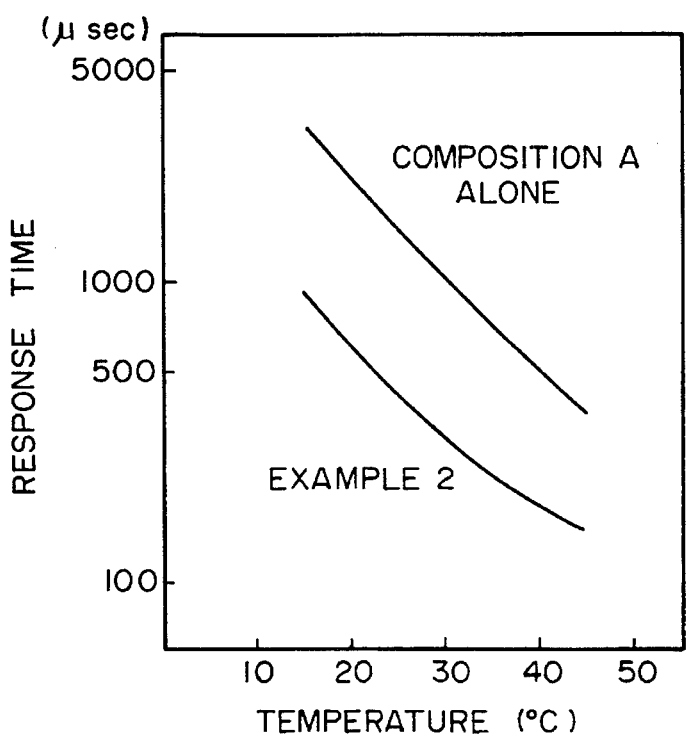
FIG. 5 is a graph showing temperature-dependent changes in response time of the liquid crystal composition A and the liquid crystal composition of Example 2.

As is understood from FIGS. 4 and 5, the liquid crystal composition containing three series of mesomorphic compounds having different structures of optically active sites is provided with a large degree of freedom in controlling the magnitude of spontaneous polarization and is correspondingly capable of easily improving the response speed. Further, it was also possible to select compositional ratios in a liquid crystal composition providing a highest reponse speed within a range of spontaneous polarization giving a good bistability affecting largely the contrast of a device during driving.

EXAMPLE 3

A ferroelectric liquid crystal device was prepared in the same manner as in Example 1 except that the following Example Compounds selected from the list described hereinbefore were mixed in the respectively indicated proportions to provide a ferroelectric liquid crystal composition used. Then, the device was subjected to measurement of optical response time and observation of switching states. The results are shown below.

| Example Compound | Weight parts |
| --- | --- |
| (1-1) | 12 |
| (1-8) | 20 |
| (2-1) | 27 |
| (2-34) | 13 |
| (2-33) | 28 |
| (5-8) | 5 |
| (5-12) | 7 |
| (5-31) | 8 |
| (5-40) | 5 |
| (N-1) | 5 |
| (N-11) | 10 |

| 10° C. | 25° C. | 40° C. |
| --- | --- | --- |
| 1300 μsec | 390 μsec | 170 μsec |

The device was driven at 25° C. to provide a contrast of 18, and a clear switching action was observed. Further, the bistability after removal of voltages was also found to be good.

COMPARATIVE EXAMPLE 3

A ferroelectric liquid crystal device was prepared in the same manner as in Example 3 except that Example Compounds (5-8), (5-12), (5-31) and (5-40) were omitted from the liquid crystal composition, and subjected to measurement of the optical response time and observation of switching states, etc. The results are shown below.

| 10° C. | 25° C. | 40° C. |
|---|---|---|
| 2600 μsec | 880 μsec | 360 μsec |

EXAMPLE 4

A ferroelectric liquid crystal device was prepared in the same manner as in Example 1 except that the following Example Compounds were mixed in the respectively indicated proportions to provide a ferroelectric liquid crystal composition used. Then, the device was subjected to measurement of optical response time and observation of switching states. The results are shown below.

| Example Compound | Weight parts |
|---|---|
| (1-1) | 10 |
| (1-4) | 15 |
| (1-12) | 25 |
| (1-21) | 20 |
| (1-22) | 10 |
| (3-1) | 10 |
| (3-9) | 10 |
| (7-4) | 20 |
| (N-6) | 5 |
| (N-9) | 10 |

| 10° C. | 25° C. | 40° C. |
|---|---|---|
| 1400 μsec | 420 μsec | 150 μsec |

The device was driven at 25° C. to provide a contrast of 13, and a clear switching action was observed. Further, the bistability after removal of voltages was also found to be good.

COMPARATIVE EXAMPLE 4

A ferroelectric liquid crystal device was prepared in the same manner as in Example 4 except that Example Compound (7-4) was omitted from the liquid crystal composition, and subjected to measurement of the optical response time and observation of switching states, etc. The results are shown below.

| 10° C. | 25° C. | 40° C. |
|---|---|---|
| 2300 μsec | 700 μsec | 220 μsec |

EXAMPLE 5

A ferroelectric liquid crystal device was prepared in the same manner as in Example 1 except that the following Example Compounds were mixed in the respectively indicated proportions to provide a ferroelectric liquid crystal composition used. Then, the device was subjected to measurement of optical response time and observation of switching states. The results are shown below.

| Example Compound | Weight parts |
|---|---|
| (1-3) | 20 |
| (1-19) | 25 |

-continued

| Example Compound | Weight parts |
|---|---|
| (1-20) | 25 |
| (1-28) | 10 |
| (1-40) | 20 |
| (2-16) | 20 |
| (2-21) | 30 |
| (4-16) | 5 |
| (5-13) | 10 |
| (5-38) | 15 |
| (5-40) | 20 |

| 10° C. | 25° C. | 40° C. |
|---|---|---|
| 1420 μsec | 410 μsec | 170 μsec |

The device was driven at 25° C. to provide a contrast of 12, and a clear switching action was observed. Further, the bistability after removal of voltages was also found to be good.

COMPARATIVE EXAMPLE 5

A ferroelectric liquid crystal device was prepared in the same manner as in Example 5 except that Example Compounds (4-16), (5-13), (5-38) and (5-40) were omitted from the liquid crystal composition, and subjected to measurement of the optical response time and observation of switching states, etc. The results are shown below.

| 10° C. | 25° C. | 40° C. |
|---|---|---|
| 3500 μsec | 1100 μsec | 420 μsec |

EXAMPLE 6

A ferroelectric liquid crystal device was prepared in the same manner as in Example 1 except that the following Example Compounds were mixed in the respectively indicated proportions to provide a ferroelectric liquid crystal composition used. Then, the device was subjected to measurement of optical response time and observation of switching states. The results are shown below.

| Example Compound | Weight parts |
|---|---|
| (1-11) | 15 |
| (1-44) | 23 |
| (1-50) | 35 |
| (2-12) | 10 |
| (2-28) | 17 |
| (5-35) | 5 |
| (5-40) | 15 |
| (7-4) | 10 |
| (8-5) | 5 |
| (N-7) | 5 |
| (N-8) | 5 |

| 10° C. | 25° C. | 40° C. |
|---|---|---|
| 1050 μsec | 330 μsec | 120 μsec |

The device was driven at 25° C. to provide a contrast of 14, and a clear switching action was observed. Further, the bistability after removal of voltages was also found to be good.

COMPARATIVE EXAMPLE 6

A ferroelectric liquid crystal device was prepared in the same manner as in Example 6 except that Example Compounds (5-35), (5-40), (7-5) and (8-5) were omitted from the liquid crystal composition, and subjected to observation of switching states, etc., whereas clear switching action was not observed.

EXAMPLE 7

A ferroelectric liquid crystal device was prepared in the same manner as in Example 1 except that a 2%-aqueous solution of polyvinyl alcohol resin ("PVA-17", available from Kuraray K.K.) was used instead of the 1.5%-solution of polyimide resin precursor in dimethylacetoamide. The optical response time of the device was measured in the same manner as in Example 1 to provide the following results:

| 10° C. | 25° C. | 40° C. |
|---|---|---|
| 1100 μsec | 350 μsec | 145 μsec |

Further, the device showed a contrast of 23 when driven at 25° C.

EXAMPLE 8

A ferroelectric liquid crystal device was prepared in the same manner as in Example 1 except that each glass plate having an ITO film was provided with an alignment control layer consisting only of the polyimide resin, and subjected to measurement of the optical response time in the same manner as in Example 1. Then results are shown below.

| 10° C. | 25° C. | 40° C. |
|---|---|---|
| 1100 μsec | 360 μsec | 150 μsec |

As is understood from the above-described Examples, according to the present invention, there is realized a ferroelectric liquid crystal device which has improved low-temperature operation characteristic, high-speed responsiveness and also an improved contrast ratio through good bistable switching states.

What is claimed is:

1. A ferroelectric liquid crystal composition, comprising three mesomorphic compounds represented by the following formula (I):

$$Z-\underset{\underset{H}{|}}{\overset{\overset{A}{|}}{C^*}}-B, \quad (I)$$

wherein C* denotes a single asymmetric carbon atom; Z denotes a mesomorphic compound residue including a divalent 6-membered ring-containing group containing two to four 6-membered rings selected from the group consisting of

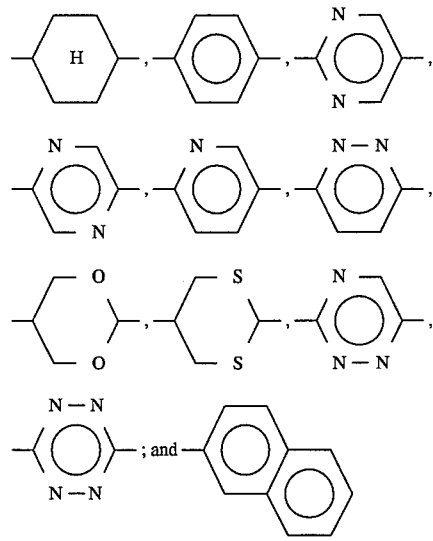

with the proviso that Z is represented by the formula $R_1-X_0-D-X-$, wherein $R_1$ denotes a $C_2-C_{16}$ linear or branched alkyl group with the proviso that one non-terminal $CH_2$ group can be replaced by $-O-$; $X_0$ denotes a single bond, $-O-$, $-CO.O-$, $-O.CO-$, $-CO-$, $-OCO.O-$ or $-OCH_2CH_2-$; D denotes a unit including said two to four 6-membered rings connected with a single bond, $-(-CH_2-)_m-CO.O-$, $-O.CO-(-CH_2-)_m-$, $(-CH_2-)_m-CO.S-$, $-SCO-(-CH_2-)_m-CH_2CH_2-$, $-OCH_2$, $-CH_2O-$, $-CH=CH-CO.O-$, or $-O.CO-CH=CH$ with the proviso that

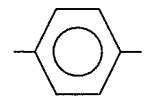

among the 6-membered rings can have one lateral ring substituent of $-F$, $-CF_3$ or $-CN$; and X denotes one of bonding groups $X_1-X_8$ defined below in series 1-8 respectively; and A and B are mutually different groups selected independently from sub-classes (a), (b), (c), (e), (f), (g), (h), (i) or (j) defined below; and said three mesomorphic compounds belong to three mutually different series of compounds selected from the following series 1-8 including at least one mesomorphic compound belonging to series 5 or series 7:

series 1: combination of (a) a methyl group, and (b) a linear alkyl group having 2–18 carbon atoms or $-CH(CH_3)_2$, wherein Z is $Z_1-X_1-$, $Z_1$ is a 6-membered ring-containing group and $X_1$ is

| | |
|---|---|
| $-O-(-CH_2-)_{\overline{n}}$ | (n = 0–5), |
| $-(-CH_2-)_{\overline{n}}$ | (n = 1, 3), |
| $-CO.O-(-CH_2-)_{\overline{n}}$ | (n = 1, 3), |
| $-O.CO-(-CH_2-)_{\overline{n}}$ | (n = 0–4), |
| $-CO-(-CH_2-)_{\overline{n}}$, | $-O.CO.O-CH_2-$, |
| $-CH_2CH_2-CO.O-$, or | $-CH=CHCO.O.CH_2-$; | series 2: combination of (a) a methyl group, and (c) a linear alkoxy group having 2–18 carbon atoms, wherein Z is $Z_2-X_2-$, $Z_2-$ is a 6-membered ring-containing group and $X_2$ is

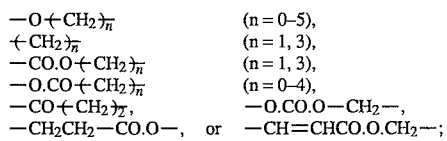
(n = 0–5),
(n = 1, 3),
(n = 1, 3),
(n = 0–4),

—CO⟨CH₂⟩ₙ̄, —O.CO.O—CH₂—,
—CH₂CH₂—CO.O—, or —CH=CHCO.O.CH₂—;

series 3: combination of (a) a methyl group, and (e) a linear alkyloxycarbonyl group having 2–18 carbon atoms wherein Z is $Z_3$-$X_3$-, $Z_3$ is a 6-membered ring-containing group and $X_3$ is

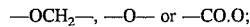
—OCH₂—, —O— or —CO.O;

series 4: combination of (g) chlorine or bromine, and (a) a methyl group or (b) a linear alkyl group having 2–18 carbon atoms or —CH(CH₃)₂, wherein Z is $Z_4$-$X_4$-, $Z_4$ is a 6-membered ring-containing group and $X_4$ is

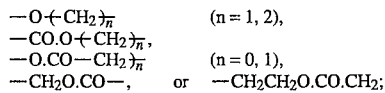
(n = 1, 2), (n = 0, 1),
—CH₂O.CO—, or —CH₂CH₂O.CO.CH₂;

series 5: combination of (h) fluorine, and (b) a linear alkyl group having 2–18 carbon atoms or —CH(CH₃)₂, wherein Z is $Z_5$-$X_5$-, $Z_5$ is a 6-membered ring-containing group and $X_5$ is

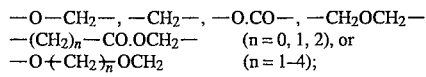
—O—CH₂—, —CH₂—, —O.CO—, —CH₂OCH₂—
—(CH₂)ₙ—CO.OCH₂—   (n = 0, 1, 2), or
—O⟨CH₂⟩ₙ̄OCH₂   (n = 1–4);

series 6: combination of (i) a trifluoromethyl group, and (f) an alkyloxycarbonylmethyl group having 3–18 carbon atoms, wherein Z is $Z_6$-CO.O— and $Z_6$ is a 6-membered ring-containing group;

series 7: combination of (i) a trifluoromethyl group, and (b) a linear alkyl group having 2–18 carbon atoms or —CH(CH₃)₂—, wherein Z is $Z_7$-$X_7$-, $Z_7$ is a 6-membered ring-containing group and $X_7$ is

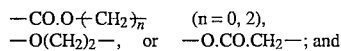
(n = 0, 2),
—O(CH₂)₂—, or —O.CO.CH₂—; and series 8: combination of (j) a cyano group, and (b) a linear alkyl group having 2–18 carbon atoms or —CH(CH₃)₂, wherein Z is $Z_8$-$X_8$-, $Z_8$ is a 6-membered ring-containing group and $X_8$ is

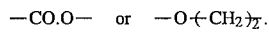
—CO.O— or —O⟨CH₂⟩ₙ̄.

2. A composition according to claim 1, wherein said at least three mesomorphic compounds include at least two mesomorphic compounds which have groups A belonging to the same sub-class and groups B belonging to different sub-classes.

3. A composition according to claim 1, which provides a liquid crystal having chiral smectic C phase.

4. A composition according to claim 1, which comprises at least three mesomorphic compounds represented by the formula (I) and further an optically inactive mesomorphic compound.

5. A composition according to claim 4, wherein said optically inactive mesomorphic compound is a mesomorphic compound having a pyrimidine skeleton.

6. A composition according to claim 4, wherein said optically inactive mesomorphic is one having a nematic phase.

7. A composition according to claim 4, wherein said optically inactive mesomorphic compound is one having a smectic phase.

8. A ferroelectric liquid crystal device, comprising a pair of substrates respectively having voltage application means, and a ferroelectric liquid crystal composition according to any one of claims 2, 3 and 4–7 disposed between the pair of substrates; at least one of the substrates having an alignment control layer thereon.

* * * * *

UNITED STATES PATENT AND TRADEMARK OFFICE
CERTIFICATE OF CORRECTION

PATENT NO. : 5,478,495

DATED : December 26, 1995

INVENTORS : MASAHIRO TERADA ET AL.

It is certified that error appears in the above-identified patent and that said Letters Patent is hereby corrected as shown below:

ON TITLE PAGE

In [30] Foreign Application Priority Data:
"Jul. 1, 1987 [JP] Japan...62-190163" should read
--Jul. 31, 1987 [JP] Japan...62-190163--

In [57] Abstract: "E" should read --Z--

COLUMN 2

Line 9, "is" should read --are.
Line 14, "has" should read --have--.

COLUMN 6

Line 6, "gelonging" should read --belonging--.

UNITED STATES PATENT AND TRADEMARK OFFICE
CERTIFICATE OF CORRECTION

PATENT NO. : 5,478,495

DATED : December 26, 1995

INVENTORS : MASAHIRO TERADA ET AL.

It is certified that error appears in the above-identified patent and that said Letters Patent is hereby corrected as shown below:

COLUMN 9

Line (1-25) "$C_{11}H_{23}$-" should read --$C_{11}H_{23}O$---.

COLUMN 31

Line 40, "hereinbelow" should be deleted.

COLUMN 34

Line 21, "were" should read --and--.

COLUMN 36

Line 48, "contained" should read --be contained--.

UNITED STATES PATENT AND TRADEMARK OFFICE
CERTIFICATE OF CORRECTION

PATENT NO. : 5,478,495

DATED : December 26, 1995

INVENTORS : MASAHIRO TERADA ET AL.

It is certified that error appears in the above-identified patent and that said Letters Patent is hereby corrected as shown below:

COLUMN 38

Line 61, "selaed" should read --sealed--.

COLUMN 39

Line 7, "algined" should read --aligned--.
Line 43, "and" should read --or--.

COLUMN 40

Line 10, "second" should read --seconds--.

COLUMN 41

Line 58, "was" should read --were--.
Line 59, "composition" should read --compositions--.

UNITED STATES PATENT AND TRADEMARK OFFICE
CERTIFICATE OF CORRECTION

PATENT NO. : 5,478,495

DATED : December 26, 1995

INVENTORS : MASAHIRO TERADA ET AL.

It is certified that error appears in the above-identified patent and that said Letters Patent is hereby corrected as shown below:

COLUMN 48

Line 30, "mesomorphic" should read --mesomorphic compound--.

Line 39, "claims 2, 3 and 4-7" should read --claims 2 to 7,--.

Signed and Sealed this

Seventh Day of May, 1996

Attest:

BRUCE LEHMAN

*Attesting Officer*  Commissioner of Patents and Trademarks